(12) United States Patent
Yagi

(10) Patent No.: US 7,760,443 B2
(45) Date of Patent: Jul. 20, 2010

(54) ZOOM LENS DEVICE

(75) Inventor: Fumiya Yagi, Osaka (JP)

(73) Assignee: Panasonic Corporation, Osaka (JP)

(*) Notice: Subject to any disclaimer, the term of this patent is extended or adjusted under 35 U.S.C. 154(b) by 449 days.

(21) Appl. No.: 11/719,038

(22) PCT Filed: Nov. 29, 2005

(86) PCT No.: PCT/JP2005/021847
§ 371 (c)(1),
(2), (4) Date: May 10, 2007

(87) PCT Pub. No.: WO2006/057399
PCT Pub. Date: Jun. 1, 2006

(65) Prior Publication Data
US 2009/0059389 A1    Mar. 5, 2009

(30) Foreign Application Priority Data
Nov. 29, 2004 (JP) ............................. 2004-343500
Mar. 31, 2005 (JP) ............................. 2005-102214

(51) Int. Cl.
*G02B 15/14* (2006.01)
(52) U.S. Cl. ..................................... 359/704
(58) Field of Classification Search ............... 359/696, 359/699, 700, 701, 704
See application file for complete search history.

(56) References Cited

U.S. PATENT DOCUMENTS
6,546,200 B2    4/2003    Yamaguchi

FOREIGN PATENT DOCUMENTS

| JP | 57-133415 A | 8/1982 |
|---|---|---|
| JP | 4-102811 A | 4/1992 |
| JP | 9-329733 A | 12/1997 |
| JP | 2000-227623 A | 8/2000 |
| JP | 2001-324662 A | 11/2001 |
| JP | 2002-350709 | * 12/2002 |
| JP | 2002-350709 A | 12/2002 |
| JP | 2004-013086 A | 1/2004 |
| JP | 2004-343500 | 1/2010 |

OTHER PUBLICATIONS

International Search Report for PCT/JP2005/021847, dated Mar. 7, 2006.

* cited by examiner

*Primary Examiner*—Joseph Martinez
(74) *Attorney, Agent, or Firm*—RatnerPrestia

(57) ABSTRACT

A zoom lens device is reduced in size and capable of zoom operation with the number of steps large enough to display the value as a zoom lens. The zoom lens device comprises lens system (A) with a first lens group, a second lens group, and a third lens group arranged on optical axis (Z). It comprises zoom mechanism (E) for changing the focal distance of lens system (A) by changing the second lens group in the direction of optical axis (Z). It comprises focus mechanism (C) for adjusting the image forming position of lens system (A) by moving the third lens group 13 in the same direction as optical axis (Z). It also comprises driving force transmitting section (B) for transmitting the driving force from the motor to zoom mechanism (E) and focus mechanism (C). Driving force transmitting section (B) includes stopwork (D) like Geneva drive (F) for intermittently transfer the driving force from the driving source to zoom mechanism (E).

19 Claims, 16 Drawing Sheets

F I G. 7
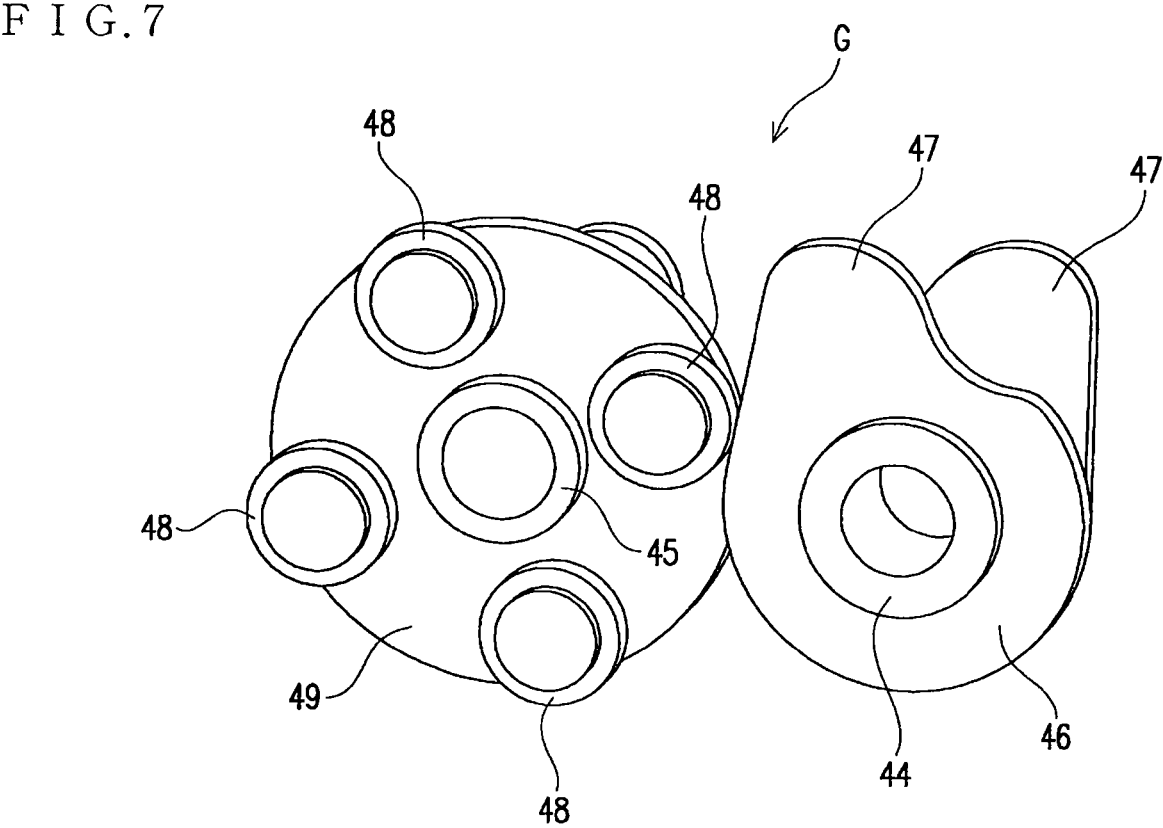

ZOOM LENS DEVICE

TECHNICAL FIELD

The present invention relates to a zoom lens device having a plurality of lens groups mounted in a camera or the like, and more particularly, it relates to a zoom lens device comprising a zoom mechanism of which the lens group position changes in a step-like fashion.

BACKGROUND ART

A multi-focus magnification switching lens-barrel which is mounted in a camera in such manner as to move a plurality of lens groups between the position of a short focal distance and the position of a long focal distance, and is provided with a step zoom mechanism for selecting a plurality of focal distances is disclosed in Japanese Laid-Open Patent H9-329733. The multi-focus magnification switching lens-barrel has a fixed barrel inserted in a rotary barrel, and in the fixed barrel are inserted the first moving barrel holding the front group lenses and the second moving barrel holding the rear group lenses.

The rotary barrel is formed with a power varying cam groove for front group lenses and a power varying cam groove for rear group lenses which serve to guide the first and second moving barrels respectively. The fixed barrel is formed with a focusing cam groove having an inflecting portion and a guide groove for guiding the first moving barrel. A cam pin engaging the power varying cam groove for front group lenses and the guide groove is formed in the first moving barrel, and also, a cam pin engaging the power varying cam groove for rear group lenses and the focusing cam groove is formed in the second moving barrel.

Further, there is provided a gear portion at the outer periphery of the rear end of the rotary barrel, and the rotary barrel driven by a motor rotates with its optical axis as rotary axis. As the rotary barrel is rotated, power varying and focusing operations are simultaneously performed.

That is, when the rotary barrel slightly rotates to the extension side, the first moving barrel linearly moves along the guide groove of the fixed barrel. The second moving barrel makes a refractive move at the inflection portion of the focusing cam groove, becoming less in the amount of movement in the direction of optical axis as compared with the first moving barrel. During the time, the lens system remains unchanged in magnification, and focusing is performed in a range from the infinite distance to the closest distance in a state of being wide. In this way, power varying and focusing at each power varying position are performed by using the same driving source in order to realize the reduction of size and cost of the camera.

However, such a multi-focus magnification switching lens-barrel is formed with a power varying cam groove, focusing cam groove, and guide groove in a rotary barrel, and therefore, in case of mounting it in a very small camera built into a portable electronic apparatus such as a portable telephone, it is difficult to form each groove because the rotary barrel is too small.

To solve this problem, it is possible to use a zoom lens device provided with a cam for enabling a very small camera to have a step zoom mechanism. The zoom lens device comprises, as shown in FIG. 15, one motor 1 as a driving source, cam 3 formed by a spiral rib protruded from cylindrical rotary shaft 2, and lens system A arranged on optical axis Z of pickup element 4.

The rotary shaft of motor 1 and the rotary shaft of cam 3 are fitted with gears (hereinafter called "first gear", "third gear") 5, 6. The first gear 5 and the third gear 6 engage middle gear (hereinafter called "second gear") 7, and the rotational force is transmitted in this way, but it is preferable to omit the second gear 7, making the first gear 5 and the third gear 6 engage each other.

And, the outer surface (at the left in the figure) of cam 3 is zoom cam surface 8, and the inner surface (at the right in the figure) thereof is focus cam surface 9. Zoom cam surface 8 is formed with a plurality of flat and slant portions (five portions here) alternately. Focus cam surface 9 is formed on slant portion.

And, lens system A includes first lens group 11, second lens group 12, and third lens group 13 arranged on optical axis Z from inner to outer side in order, and the third lens group 13 is opposed to pickup element 4. The main role of second lens group 12 is to change the focal distance (zooming) of lens system A. The main role of third lens group 13 is to adjust the image forming position of lens system A, that is, to focus (focusing) to pickup element 4.

First lens group 11 is held by an immovable holding frame (not shown). Second lens group 12 and third lens group 13 are respectively held by holding frames 14, 15 which are individually movable in the same direction as optical axis Z. (Hereinafter called "second holding frame" and "third holding frame.")

Paired guide shafts 16 are piercing the second holding frame 14 and the third holding frame 15, and both holding frames 14, 15 are guided by guide shafts 16 when moving. On one of the guide shafts 16 are wound activating means like a compression spring which serves to fit zoom follower 17 of second holding frame 14 to zoom cam surface 8, and activating means 18 like a compression spring which serves to fit focus follower 19 of third holding frame 15 to focus cam surface 9. Accordingly, cam 3 is always sandwiched between zoom follower 17 and focus follower 19.

The zoom lens device is configured as described above, and the operation of the device is described in the following with reference to FIG. 16 as well. When motor 1 rotates, the driving force is transmitted by first gear 5, second gear 7, and third gear 6 to rotary shaft 2 of cam 3, then cam 3 is rotated. And then, the engaged portion of zoom follower 17 and zoom cam surface 8, and the engaged portion of focus follower 19 and focus cam surface 9 move outwardly or inwardly along the same direction of optical axis Z.

Since zoom can surface 8 is formed with flat and slant portions alternately, zoom follower 17, as shown by characteristic 82 in FIG. 16, does not move outwardly when it is moving on the flat portion, and it moves outwardly only when moving on the slant portion. Accordingly, zoom follower 17 and second lens group 12 move in a step-like fashion, and thereby, the zoom operation is performed.

On the other hand, since focus cam surface 9 is formed with only slant portion, focus follower 19 continuously moves outwardly as shown by characteristic 84 in FIG. 16. Accordingly, even when motor 1 keeps rotating, and cam 3 keeps rotating, zoom follower 17 engages the flat portion of zoom cam surface 8, and third lens group 13 moves while second lens group 12 is in a stop, thereby executing the focus operation. Thus, both of the zoom and focus operations are performed by one motor 1 in this zoom lens device.

In the zoom lens device described above, if the number of steps is increased to cope with various zooms, the number of flat portions of zoom cam surface 8 increases causing the zoom cam 3 to become larger in diameter, and this is disadvantageous to the size reduction. Contrarily, if the number of steps is decreased, it is possible to reduce the size, but the number of zoom patterns is limited, and the value as a zoom lens device is lowered.

Also, the conventional example presupposes the use of a zoom lens system based on optical design such that the movement of focus mechanism nearly follows the movement of zoom mechanism. And generally, the locus of lens movement or zooming, is partially utilized for focusing.

However, the locus of focus movement greatly deviates from the locus that follows the zoom movement. In other words, in the case of a zoom optical system based on optical design such that the locus of focus movement and the locus of zoom movement are highly independent of each other, it is difficult to realize practically appropriate step zoom operation by using the configuration of the conventional example.

In a zoom optical system wherein focus movement is attained by the movement of a lens group closer to the image forming side, the locus of lens movement for focus movement often nearly follows the locus of zoom movement. On the other hand, in a zoom optical system wherein focus movement is attained by the movement of a lens group closer to the object side, the locus of lens movement for focus movement often greatly deviates from that of zoom movement. Accordingly, in the case of the latter zoom optical system, it is difficult to configure a step zoom lens device by using the configuration of the conventional example.

In the latter zoom optical system, the amount of focus movement is often greater as compared with the former, and it has advantages for design such that it is easier to maintain the accuracy of focus even without satisfying as high design accuracy as that of the former. There still exists a problem as mentioned above, it is unable to provide a high-quality zoom lens device by using such a zoom optical system.

DISCLOSURE OF THE INVENTION

The present invention is intended to provide a zoom lens device capable of zoom operation with the number of steps that enables the reduction of size and the best use of the device as a zoom lens.

Also, the present invention provides a zoom lens device which is effective for quality improvement, for example, as in a zoom optical system such that the focus movement is attained by the movement of a lens group closer to the object side, while it is possible to use an optical system wherein the locus of lens movement for focus movement greatly deviates from that of zoom movement.

The zoom lens device of the present invention comprises a lens system with a plurality of lens groups arranged on the optical axis. It has a zoom mechanism for changing the focal distance of the lens system by moving at least one of the lens groups out of the plurality of lens groups in the same direction as the optical axis. Also, it has a focus mechanism for adjusting the image forming position of the lens system by moving multiple lens groups in the same direction as the optical axis. Also, the zoom lens device comprises a driving force transmitting section for transmitting the driving force from one driving source to the zoom mechanism and the focus mechanism. The driving force transmitting section comprises an stopwork (intermittent transfer mechanism) for intermittently transferring the driving force from the driving source to the zoom mechanism.

According to the zoom lens device, even in case of only one driving source, the zoom mechanism is able to continuously move multiple lens groups in the same direction as the optical axis in a step-like fashion, repeating the stop and move, due to the stopwork. Also, the focus mechanism continuously moves multiple lens groups in the same direction as the optical axis. Due to the stopwork, when the lens group for changing the focal distance is in a stop, the focus operation can be performed by moving at least one of the lens groups out of the plurality of lens groups by means of the focus mechanism. That is, according to the zoom lens device, since such a so-called step zoom operation is realized by an stopwork, it is not necessary to dispose a flat portion on the cam traced by the zoom mechanism as in the conventional example. It is possible to realize the size reduction while keeping the number of steps enough for displaying the value as a zoom lens.

In the zoom lens device, the stopwork is preferable to be a Geneva drive (Maltese drive).

The Geneva drive is a mechanism wherein a driving wheel is combined with a driven wheel, and the driving wheel is formed with an arcuate convex and provided with one pin outside the arcuate convex. On the other hand, the driven wheel is formed with an arcuate concave engaging the arcuate convex and with a plurality of radial grooves in which the pin is fitted. The driving force of one driving source is transmitted to the driving wheel, then the driven wheel is rotated only with the pin of the rotating driving wheel fitted in the radial groove of the driven wheel, and the driven wheel stops with the pin removed from the radial groove. When the driven wheel is rotating, the lens group moves to perform the zoom operation. On the other hand, when the driven wheel is in a stop, the lens group also stops, thereby discontinuing the zoom operation. That is, the lens group moves in a step-like fashion due to the Geneva drive to perform the zoom operation. And, even when the lens group is in a stop, the focus mechanism is active, and it performs the focus movement as the lens group moves.

Accordingly, according to the zoom lens device, the stopwork is formed of Geneva drive, and the number of steps of the step zoom can be set in accordance with the number of radial grooves of the driven wheel. Accordingly, despite of the simple structure, it is possible to cope with the number of steps without increasing the diameter of the driven wheel and to reduce the size without sacrificing the using convenience as a zoom lens.

Also, in the zoom lens device, the stopwork is preferable to be a parallel indexing drive.

The parallel index cam is configured in that a driving wheel is combined with a driven wheel, and the driving wheel is formed with an extension on a plate cam. The driven wheel is provided with a plurality of pins engaging the plate cam which are concentrically projected from a disk. The driving force of one driving source is transmitted to the driving wheel, then the driven wheel is rotated only when the extension of the driving wheel is giving a rotational force to the driven wheel, and the driven wheel stops with the extension moved off from the pin. When the driven wheel is rotating, the lens group moves to perform the zoom operation. On the other hand, when the driven wheel is in a stop, the lens group also stops, causing the zoom mechanism to stop. That is, the lens group moves in a step-like fashion due to the parallel indexing drive to perform the zoom operation. And, even when the lens group is in a stop, the focus mechanism is active and performs the focus operation as the lens group moves.

According to the zoom lens device, since the stopwork is formed of a parallel indexing drive, the play of the cam mechanism can be decreased despite of the simple structure, and it is advantageous for the zoom operation performed with higher accuracy.

Also, in the zoom lens device, the zoom mechanism is preferable to comprise a zoom follower disposed in the holding frame which holds the lens group for changing the focal distance, a spiral zoom cam surface disposed in the stopwork, and an activating means for making the zoom follower engage the zoom cam surface.

According to the zoom lens device, the zoom follower disposed in the holding frame which holds the lens group is activated by the activating means to engage the spiral zoom cam surface. The engaging portion moves in the same direction as the optical axis, and thereby, the lens group held by the holding frame moves on the optical axis. Since the spiral zoom cam surface is intermittently rotated by the stopwork, the holding frame also intermittently moves in the same direction as the optical axis, and the lens group held by the holding frame moves in a step-like fashion on the optical axis.

Also, in the zoom lens device, the focus mechanism is preferable to comprise a focus follower disposed in the holding frame which holds the lens group for adjusting the image forming position, a moving body which is moved by the driving force of the driving force transmitting section in the same direction as the optical axis, and an activating means for making the focus follower engage the moving body.

According to the zoom lens device, the focus follower disposed in the holding frame which holds the lens group is activated by the activating means to engage the moving body. As the moving body moves in the same direction as the optical axis, the lens held by the holding frame continuously moves on the optical axis. Accordingly, even with the lens group for zoom operation stopped due to the zoom mechanism, the lens group for focus operation is continuously moved by the focus mechanism to execute the focus operation.

Also, in the zoom lens device, the focus mechanism comprises a focus follower disposed in the holding frame which holds the lens group for adjusting the image forming position. Also, it comprises a spiral focus cam surface which is rotated by the driving force of the driving force transmitting section in the same direction as the optical axis, and an activating means for making the focus follower engage the focus cam surface.

According to the zoom lens device, the focus follower disposed in the holding frame which holds the lens group is activated by the activating means to engage the spiral focus cam surface, and then the focus cam surface is rotated. In this way, the engaging surface of the focus follower and the focus cam surface non-linearly moves in the same direction as the optical axis. Accordingly, even with the lens group for zoom operation stopped due to the zoom mechanism, the lens group for focus operation non-linearly moves on the optical axis due to the focus mechanism to execute the focus operation. In order to prevent the focus follower from moving off from the spiral focus cam surface, it is devised so that the lens moving speed for focus operation is lower than the lens moving speed for zoom operation.

According to the present invention, since there is provided an stopwork for intermittently transferring the driving force from one driving source to the zoom mechanism, despite of the relatively simplified structure, there is no need of providing the cam traced by the zoom mechanism with a flat portion as in the conventional example. As a result, it is possible to ensure the number of steps enough for displaying the value as a zoom lens and to realize the size reduction. Accordingly, it is possible to mount the zoom lens device having a step zoom function in a very small camera installed in a portable electronic apparatus such as a portable telephone.

Also, in the other zoom lens device of the present invention, a lens system with a plurality of lens groups arranged on the optical axis and multiple lens groups are moved in the same direction as the optical axis. Also, it comprises at least one zoom mechanism which changes the focal distance of the lens system and stops the movement of at least one lens group out of the plurality of lens groups for a specific period of time at a plurality of predetermined focal distances. It also comprises a focus mechanism for adjusting the image forming position of the lens system by moving multiple lens groups in the same direction as the optical axis of at least one zoom mechanism, thereby moving the lens groups in the same direction as the optical axis. Also, it comprises a driving force transmitting section for transmitting the driving force from one driving source to the focus mechanism and the zoom mechanism. When the zoom mechanism is in a state of stopping at least one lens group, the focus mechanism moves at least one zoom mechanism in the same direction as the optical axis.

In such a configuration, the zoom mechanism realizes so-called step zoom operation such that at least one lens group out of a plurality of lens groups is moved in a step-like fashion in the same direction as the optical axis in such manner as to repeat the state of stop and the state of move. Also, in each zoom step (in the state of stop) of such a step zoom, the focus mechanism moves at least one of the zoom mechanisms in the same direction as the optical axis, thereby making the focus adjustment. That is, as compared with the conventional example wherein the locus of lens movement or zooming is partially utilized for focusing, it is possible to make the focus movement more independent of the zoom movement. Accordingly, according to the zoom lens device, even in case of using an optical system wherein the locus of lens movement for focusing, for example, greatly deviates from that of zoom movement, it is possible to provide a step zoom device coping with every lens design because of being able to make the focus adjustment in each zoom step. Particularly, in the case of using a zoom optical system wherein the focus movement is made by moving a lens group closer to the object side, it is generally easy to maintain the accuracy because the amount of focus movement is very large and it is effective to improve the quality of the zoom lens device. Also, since both of the zoom mechanism and the focus mechanism can be driven by one driving source, it is advantageous for the size reduction of the device.

Also, the zoom mechanism is preferable to be such that the driving force from the driving source is intermittently transferred via an stopwork. In this configuration, in addition to the above action and effect, the movement of the zoom mechanism can be intermittently stopped by the stopwork. Zoom movement can be finally intermittently stopped, bringing about the action and effect the same as mentioned above. Also, using an stopwork, in case the zoom mechanism is designed to trace a cam for example, it is not necessary to provide the cam with a flat portion as in the conventional example, and thereby, it is possible to realize the size reduction.

Also, in the zoom lens device, the stopwork is preferable to be a Geneva drive. In the Geneva drive, a driving wheel is combined with a driven wheel, and the driving wheel is formed with an arcuate convex and provided with one pin outside the arcuate convex. On the other hand, the driven wheel is formed with an arcuate concave engaging the arcuate convex, and a plurality of radial grooves in which the pin is fitted. The driving force from one driving source is transmitted to the driving wheel, and the driven wheel rotates only when the pin of the rotating driving wheel is fitted in the radial groove of the driven wheel, and the driven wheel stops when the pin moves off from the radial groove.

Accordingly, according to the zoom lens device, in addition to the above action and effect, since the stopwork is formed of a Geneva drive, despite of the simplified structure, it brings about advantages for reducing the size without sacrificing the using convenience as a zoom lens.

Also, in the zoom lens device, the stopwork is preferable to be a parallel indexing drive.

The parallel index cam is configured in that a driving wheel and a driven wheel are combined with each other, and the driving wheel is formed with an extension on a plate cam, and the driven wheel is provided with a plurality of pins engaging the plate cam which are concentrically projected from a disk. The driving force of one driving source is transmitted to the driving wheel, then the driven wheel is rotated only when the extension of the driving wheel is giving a rotational force to the pin of the driven wheel, and the driven wheel stops with the extension moved off from the pin.

Accordingly, according to the zoom lens device, in addition to the above action and effect, since the stopwork is formed of a parallel indexing drive, the play of the cam mechanism can be decreased despite of the simple structure, and it is advantageous for the zoom operation performed with higher accuracy.

As described above, according to the zoom lens device of the present invention, the zoom mechanism realizes so-called step zoom operation such that at least one lens group out of the lens groups is moved in a step-like fashion in the same direction as the optical axis in such manner as to repeat the state of stop and the state of move, and also, in each zoom step (in the state of stop) of such a step zoom, the focus mechanism moves at least one of the zoom mechanisms in the same direction as the optical axis, thereby making the focus adjustment. That is, as compared with the conventional example wherein the locus of lens movement or zooming is partially utilized for focusing, it is possible to make the focus operation more independent of the zoom operation. Accordingly, according to the zoom lens device, even in case of using an optical system wherein the locus of lens movement for focusing, for example, greatly deviates from that of zoom movement, it is possible to provide a step zoom device coping with every lens design because of being able to make the focus adjustment in each zoom step. Particularly, in the case of using a zoom optical system wherein the focus movement is made by moving a lens group closer to the object side, it is generally easy to maintain the accuracy because the amount of focus movement is very large and it is effective to improve the quality of the zoom lens device.

BRIEF DESCRIPTION OF THE DRAWINGS

FIG. 7 is a schematic perspective view of an stopwork of the zoom lens device in the third preferred embodiment of the present invention.

DESCRIPTION OF THE REFERENCE NUMERALS AND SIGNS

Figure 1:
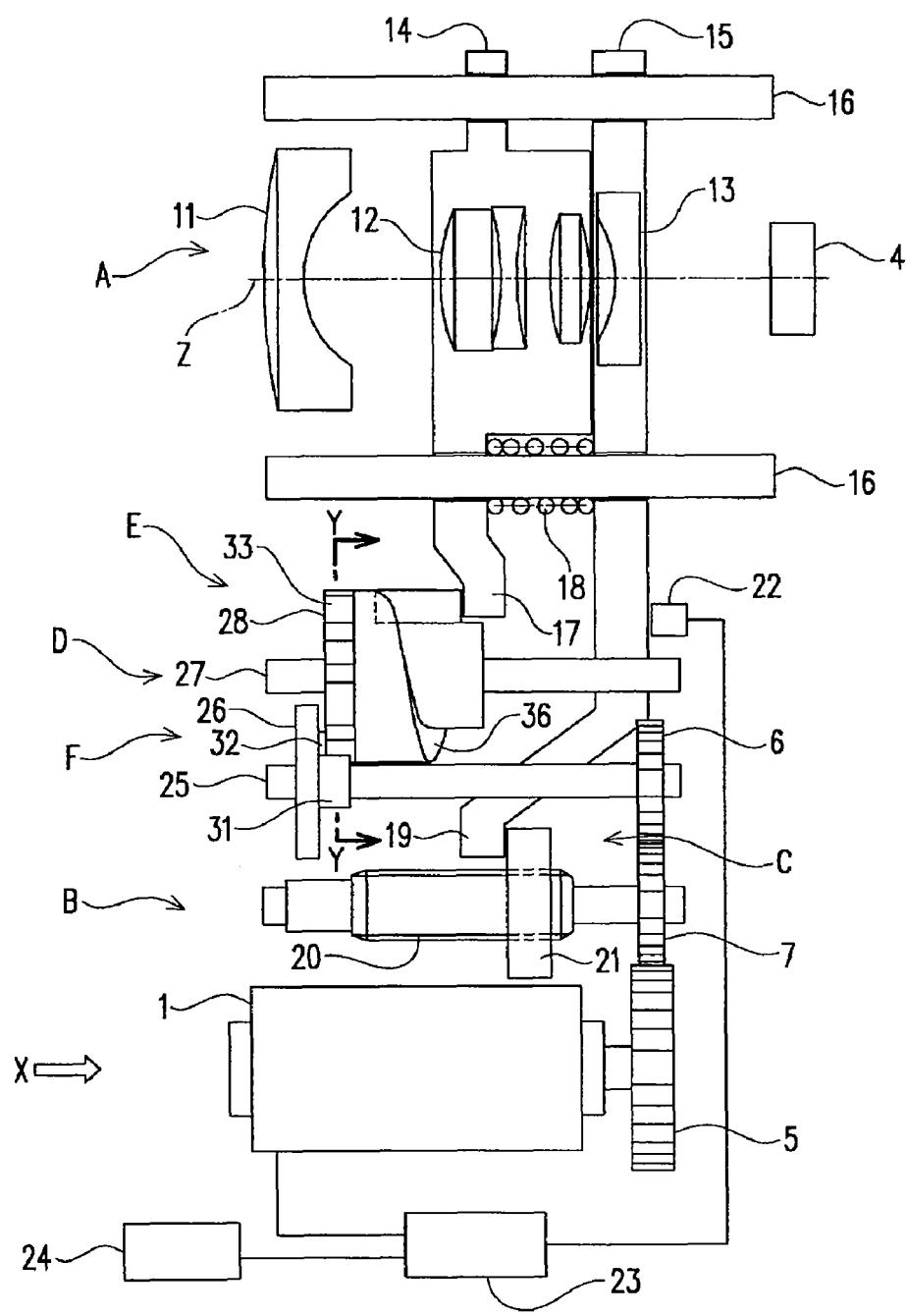
FIG. 1 is a schematic front view showing the zoom lens device in the first preferred embodiment of the present invention.

A, A100 Lens system
B, B100 Driving force transmitting section
C, C100 Focus mechanism
D, D100 Stopwork
E, E100 Zoom mechanism
F, F100 Geneva drive
G, G100 Parallel indexing drive
Z, Z100 Optical axis
1, 102 Motor
8, 36 Zoom cam surface
11, 111 First lens group
12, 112 Second lens group
13, 113 Third lens group
14, 114 Second holding frame
15, 115 Third holding frame
16, 116 Guide shaft
17, 117 Zoom follower
18, 118 Activating means
19, 119 Focus follower
21, 121 Moving body
26, 44, 104, 140 Driving wheel
28, 45, 105, 150 Driven wheel
38, 138 Focus cam surface
107 Pin
109 First cam
114 First holding frame
115 Second holding frame
123 Second cam

DETAILED DESCRIPTION OF THE PREFERRED EMBODIMENTS

Preferred Embodiment 1

The first preferred embodiment of the present invention will be described with reference to FIG. 1 to FIG. 4. The same components as the conventional ones and the equivalents are given same reference numerals, and the description is omitted. This zoom lens device comprises lens system A, driving force transmitting section B, focus mechanism C, stopwork D, and zoom mechanism E.

Lens system A comprises, as shown in FIG. 1, first lens group 11, second lens group 12, and third lens group 13 which are arranged in order on optical axis Z from the outer side (at the left in FIG. 1) to the inner side (at the right side in FIG. 1), where third lens group 13 confronts pickup element 4. First lens group 11 is held by a holding frame (not shown) which is immovable. Second lens group 12 and third lens group 13 are respectively held by second holding frame 14 and third holding frame 15 which are individually movable. Paired guide shafts 16 pierce the second holding frame 14 and third holding frame 15, and second lens group 12 and third lens group 13 regulated by guide shafts 16 and move on optical axis Z.

As the second lens group 12 and third lens group 13 move, the change of focal distance (zoom operation) in lens system A, and the adjustment of image forming position in lens system A, that is, focusing to pickup element 4 (focus operation) are performed. Second lens group 12 mainly plays the role of zoom operation, and third lens group 13 mainly plays the role of focus operation.

It is not shown, but it is also preferable to be configured in that second lens group 12 takes care of focus operation, and third lens group 13 takes care of zoom operation. Further, lens system A is preferable to comprise four or more lens groups, and in that case, two or more lens groups are preferable to play the role of zoom operation or focus operation.

And, driving force transmitting section B is provided with feed screw 20 for transfer of the driving force from motor 1 being one driving source. Feed screw 20 is disposed in the same direction as optical axis Z, and second gear 7 engaging first gear 5 fitted to motor 1 is attached to the inner end portion of the screw. The rotation of motor 1 causes the feed screw 20 to be rotated. Feed screw 20 is equipped with focus mechanism C.

Focus mechanism C comprises moving body 21 like a nut threadedly engaged on feed screw 20, focus follower 19 disposed in third holding frame 15, and activating means 18 like a compression spring fitting the focus follower 19 to the outer surface of moving body 21. Activating means 18 is wound on one guide shaft 16 in place between second holding frame 14 and third holding frame 15.

And, with feed screw 20 rotated, moving body 21 and third holding frame 15 continuously move little by little in the same direction as the optical axis Z. The position of third holding frame 15 is detected by sensor 22. Sensor 22 is connected to controller 23. Controller 23 is connected to power source 24 and motor 1, and controls the rotation of motor 1.

And, driving shaft 25 is disposed in parallel with feed screw 20. At the inner end of driving shaft 25 is installed third gear 6 engaging the second gear 7. Since feed screw 20 and driving shaft 25 are separate from each other, feed screw 20 and driving shaft 25 can be decreased in length. Also, since driving shaft 25 is formed with male screw, it is possible to integrate the feed screw 20 and driving shaft 25, achieving the space saving purpose.

And, at the outer end of driving shaft 25 is disposed stopwork D. Stopwork D is formed of Geneva drive F. Geneva drive F is such that driving wheel 26 fitted to the outer end of driving shaft 25 is combined with driven wheel 28 fitted to driven shaft 27. Driven shaft 27 is disposed in parallel with driving shaft 25.

Figure 2:
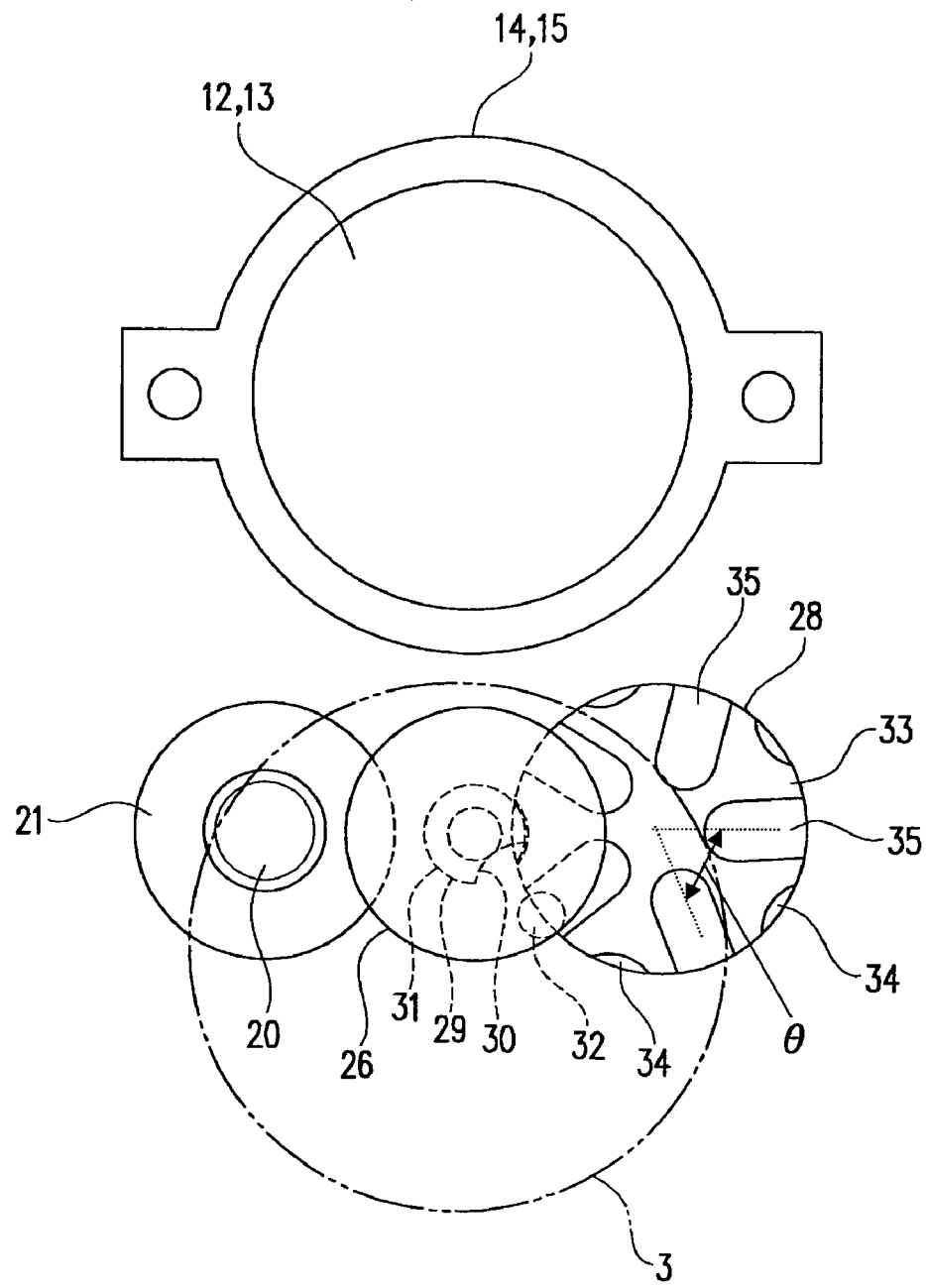
FIG. 2 is a schematic side view showing an essential portion of the zoom lens device in the first preferred embodiment of the present invention.

Driving wheel 26 includes projection 31 formed by arcuate convex 29 and arcuate concave 30 as shown in FIG. 2, and also, pin 32 is disposed outside the arcuate concave 30. On the other hand, driven wheel 28 is disk 33 fixed on driven shaft 27, which is formed with arcuate concave 34 engaging the arcuate convex 29, and at a specific angle θ, a plurality of radial grooves 35 in which pin 32 fits. As radial grooves 35, five grooves are shown in FIG. 2, but the number of grooves is not limited.

With feed screw 20 rotated, driving shaft 25 rotates because second gear 7 is in engagement with third gear 6. Then, pin 32 of driving wheel 26 continuously rotates. And, driven wheel 28 rotates while pin 32 is in radial groove 35. That is, driven wheel 28 rotates intermittently.

Figure 15:
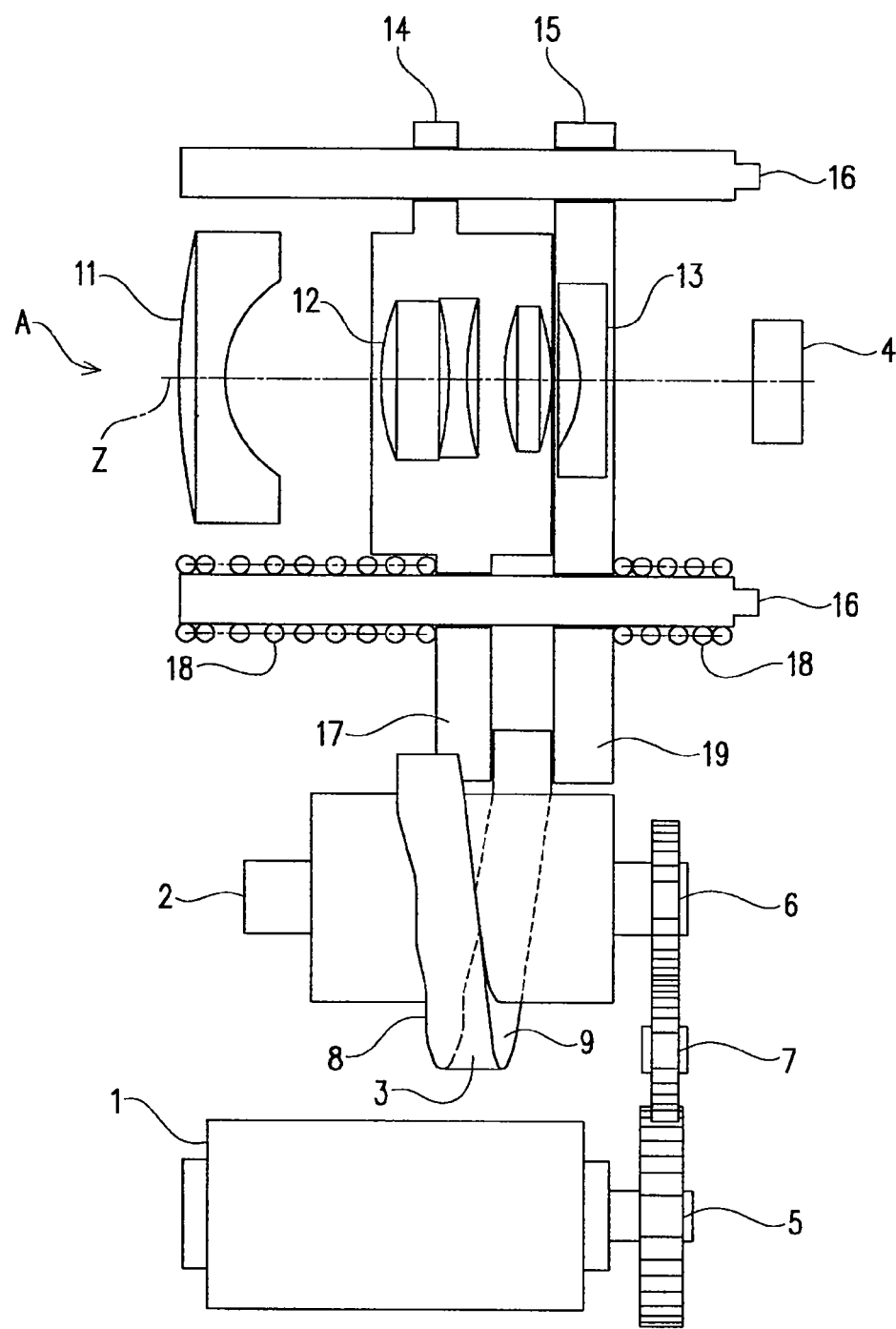
FIG. 15 is a schematic front view of a conventional zoom lens device.
Figure 16:
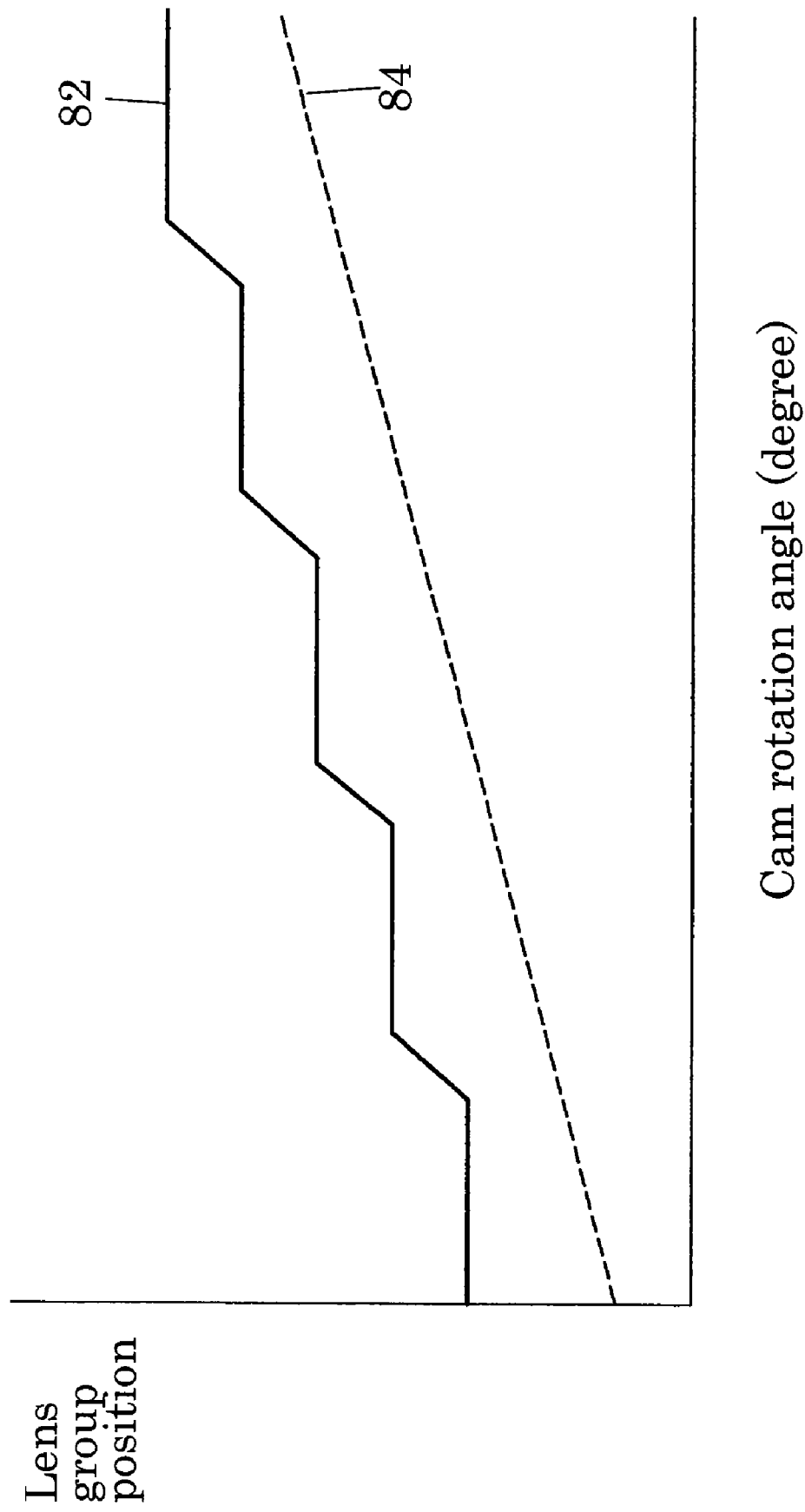
FIG. 16 shows the locus of a lens group movement of the conventional zoom lens device.

The driving force from stopwork D is transferred to zoom mechanism E. Zoom mechanism E comprises zoom follower 17 disposed in second holding frame 14, zoom cam surface 36 spirally formed on driven shaft 27, and activating means 18 like a compression spring which serves to make the zoom follower 17 engage the zoom cam surface 36. Activating means 18 is same as the one shown in the conventional example of FIG. 15, and zoom follower 17 is always in contact with zoom cam surface 36.

Accordingly, when driven shaft 27 and driven wheel 28 are rotated, the engaging portion of zoom follower 17 and zoom cam surface 36 moves in the same direction as the optical axis Z, then the second lens group 12 moves on the optical axis Z. Since driven wheel 28 intermittently rotates as described above, zoom cam surface 36 also intermittently rotates, and second lens group 12 intermittently moves on the optical axis Z.

Here, the positional relations between second lens holding frame 14 or third lens holding frame 15, moving body 21, driving wheel 26 and driven wheel 28 will be described with reference to FIG. 2. Moving body 21, driving wheel 26 and driven wheel 28 are linearly arranged, and these are disposed in such manner that the line connecting the center lines thereof is in parallel with the line connecting the paired guide shafts 16 to each other piercing the holding frames 14, 15, thereby enabling the size reduction of the zoom lens device. Accordingly, when there is a space large enough for installing the zoom lens device, it is preferable to arrange the moving body 21, driving wheel 26 and driven wheel 28 in a triangular fashion.

In any case, since driven wheel 28 is formed with five radial grooves 35 at a specific angle θ, and second lens group 12 moves in five-stage steps, the diameter of driven wheel 28 is a half of the diameter of the one formed with five flat portions on cam 3 as described in the section of the background art. That is, the diameter of driven wheel 28 is ½ of the diameter of cam 3.

The operation of the zoom lens device in the first preferred embodiment having the above configuration will be described in the following. In FIG. 1, when motor 1 rotates in the counterclockwise direction CCW as viewed from the direction shown by X, the first gear 5 rotates in the counterclockwise direction CCW, and the second gear 7 engaging the first gear 5 rotates in the clockwise direction CW. Then, feed screw 20 rotates, and moving body 21 moves from the inner side to the outer side, then third holding frame 15 and third lens group 13 being in contact with moving body 21 at focus follower 19 move from the inner side to the outer side as shown by characteristic 54 of FIG. 4.

Figure 4:
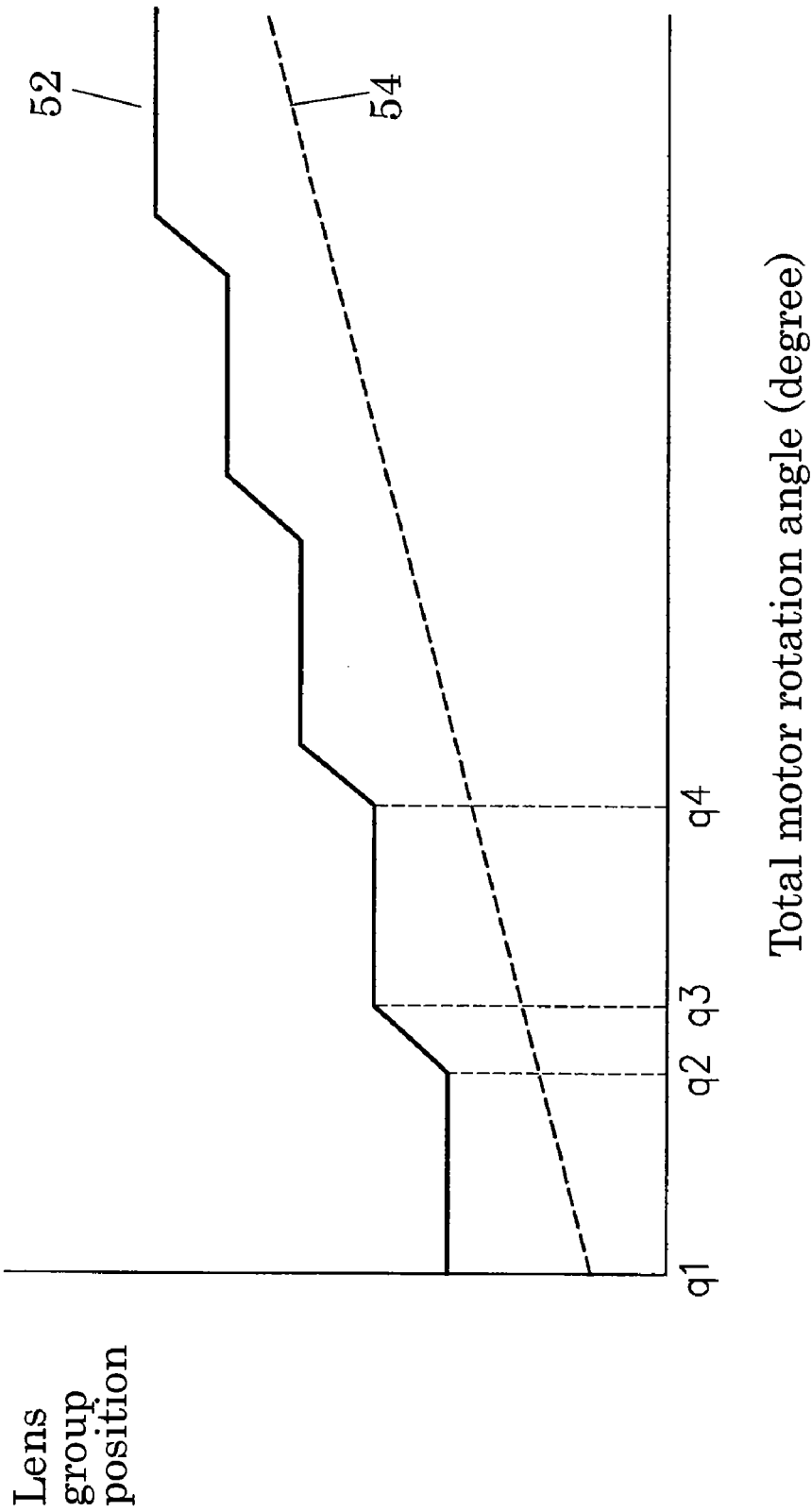
FIG. 4 shows the locus of a lens group of the zoom lens device in the first preferred embodiment of the present invention.

In FIG. 4, characteristic 52 shows a state of second holding frame 14 and the second lens group moving from the inner side to the outer side in a step-like fashion.

In parallel with this operation, third gear 6 engaging the second gear 7 rotates counterclockwise CCW, and driving shaft 25 also rotates counterclockwise CCW, and thereby, stopwork D is operated. That is, as shown in FIG. 3A, driving wheel 26 rotates counterclockwise CCW, and driven wheel 28 is in a stop until pin 32 changes its position from radial groove 35 to neighboring radial groove 35. Accordingly, second holding frame 14 and second lens group 12 are in a stop at the position ranging from q1 to q2, total rotation angle of the motor as shown in FIG. 4, and as third lens group 13 moves, only the focus operation is performed without changing the focal distance.

Subsequently, as shown in FIG. 3B, pin 32 of rotating driving wheel 26 gets in radial groove 35, and then, driven wheel 28 rotates clockwise CW just by angle θ (see FIG. 3C). During the time, driven shaft 27 also rotates just by angle θ, and as spiral zoom cam surface 36 rotates, second holding frame 14 and second lens group 12 move to perform the zoom operation as shown by q2 to q3, total rotation angle of the motor, in FIG. 4.

And, as shown in FIG. 3C, until pin 32 changes its position from radial groove 35 to neighboring radial groove 35, driving wheel 26 rotates and driven wheel 28 does not rotate the same as described above. Accordingly, second lens group 12 stops at the position ranging from q3 to q4, total rotation angle of the motor, shown in FIG. 4, and only the third lens group 13 rotates to perform only the focus operation.

Thus, even in case motor 1 keeps rotating counterclockwise CCW, driven wheel 28 and driven shaft 27 rotate intermittently, and zoom follower 17 and second lens group 12 of second holding frame 14 being in contact with zoom cam surface 36 disposed on driven shaft 27 move from the inner side to the outer side in a step-like fashion. On the other hand, since third lens group 13 continuously move, the focus operation is reliably performed.

Contrarily, when motor 1 rotates clockwise CW, second lens group 12 move from the outer side to the inner side in a step-like fashion, as third lens group 13 continuously moves from the outer side to the inner side, the zoom operation and focus operation are performed the same as described above.

In this way, since the zoom lens device drives the zoom mechanism E via stopwork D, it is not necessary to provide the cam traced by zoom mechanism E with a flat portion as in the conventional example. Consequently, it is possible to realize the size reduction while keeping the number of steps enough to display the value as a zoom lens. Also, since the stopwork D is formed of Geneva drive F, stopwork D can be reduced in size and structurally simplified, and it is advantageous for reducing the size of the zoom lens device.

Preferred Embodiment 2

Figure 5:
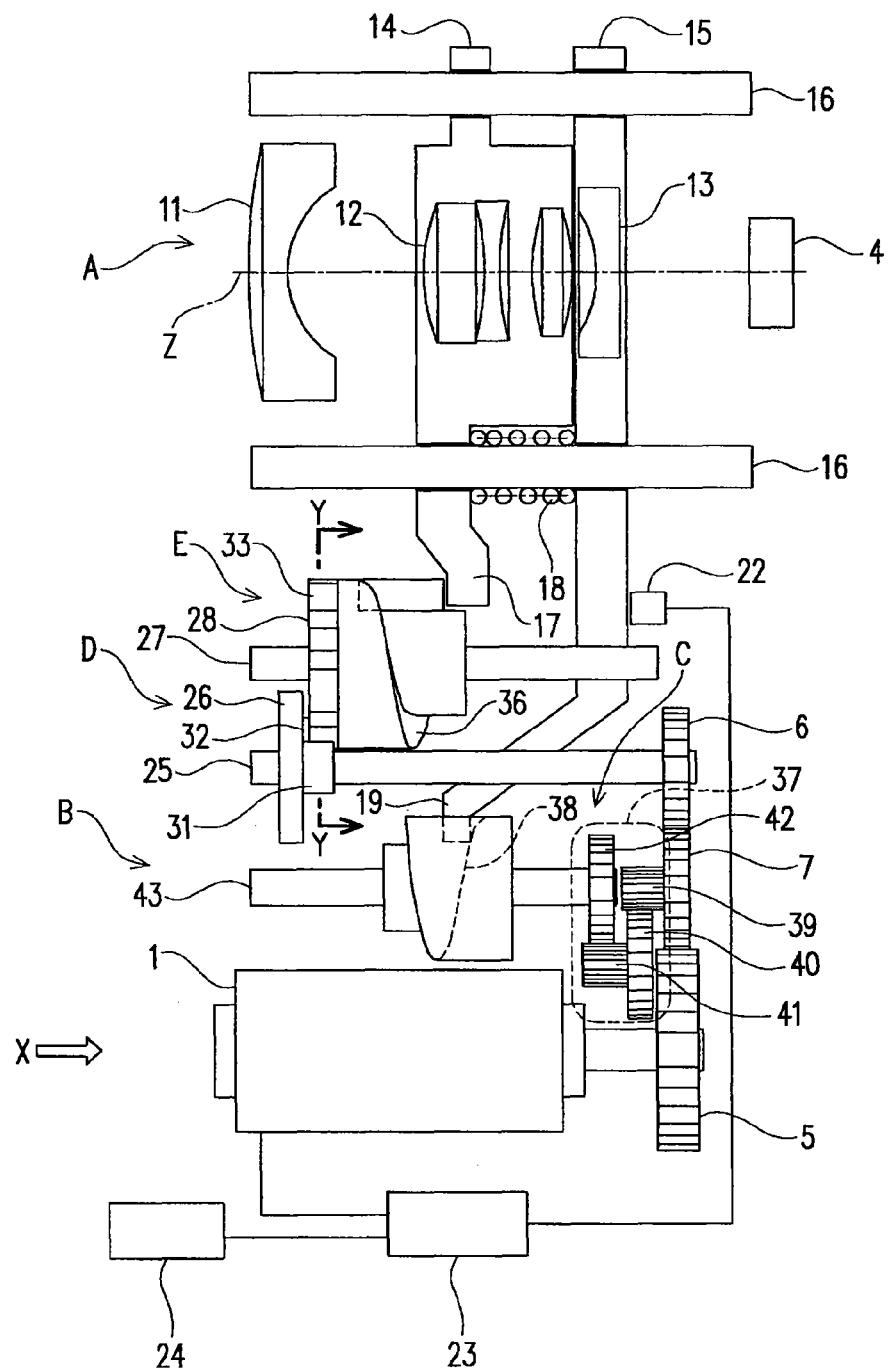
FIG. 5 is a schematic front view showing the zoom lens device in the second preferred embodiment of the present invention.

The zoom lens device in the second preferred embodiment of the present invention will be described in the following with reference to FIG. 5 and FIG. 6. The same components as in the conventional example and the first preferred embodiment and the equivalents are given same reference numerals in the description.

The zoom lens device in the second preferred embodiment is characterized in that third lens group 13 moves non-linearly. Therefore, the zoom lens device is such that focus mechanism C is provided with gear array 37 and spiral focus cam surface 38.

Gear array 37 serves to reduce the rotating speed of second gear 7, and it comprises pinion 39 coaxial with second gear 7, large gear 40 engaging the pinion 39, pinion 41 coaxial with large gear 40, and large gear 42 engaging the pinion 41. And, rotary shaft 43 same in direction as optical axis Z is fixed on large gear 42, and rotary shaft 43 is provided with focus cam surface 38.

Focus cam surface 38 is fitted with focus follower 19 disposed in third holding frame 15. Focus follower 19 will never come off from focus cam surface 38 due to gear array 37. And, focus follower 19 is always contacted on the cam surface by activating means 18. The activating means 18 also serves as activating means 18 for making zoom follower 17 disposed in second holding frame 14 at zoom mechanism E come in contact with zoom cam surface 36 formed on driven shaft 27.

The other configuration of the preferred embodiment 2 is same as in the first preferred embodiment. The operation will be described in the following. When motor 1 rotates counterclockwise CCW in the arrow-marked direction X of FIG. 5, the first gear 5 rotates counterclockwise CCW, and second gear 7 engaging first gear 5 rotates clockwise CW. And, the rotating speed is decreased by gear array 37, and rotary shaft 43 rotates clockwise CW. Then, the portion where focus cam surface 38 is in contact with focus follower 19 moves from the inner side to the outer side in the same direction as optical axis Z, while third lens group 13 held by third holding frame 15 provided with focus follower 19 moves on optical axis Z from the inner side to the outer side.

Figure 6:
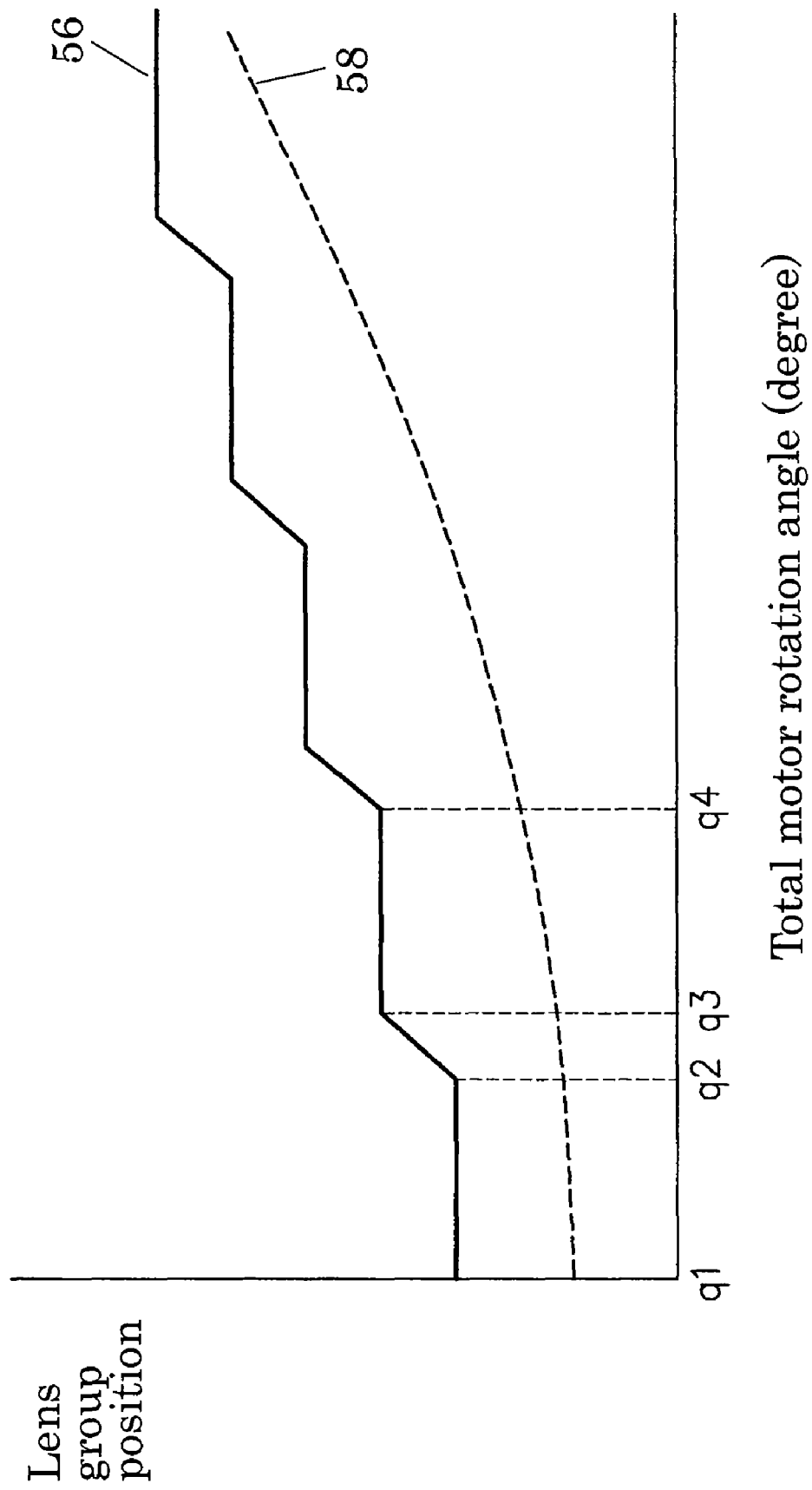
FIG. 6 shows the locus of a lens group of the zoom lens device in the second preferred embodiment of the present invention.

In the second preferred embodiment, since focus follower 19 moves on focus cam surface 38, third lens group 13 moves non-linearly as shown by characteristic 58 in FIG. 6. Accordingly, in case the lens system A is of non-linear optical design, third lens group 13 in the second preferred embodiment is able to move more smoothly and accurately as compared with third lens group 13 in the first preferred embodiment.

Figure 3:
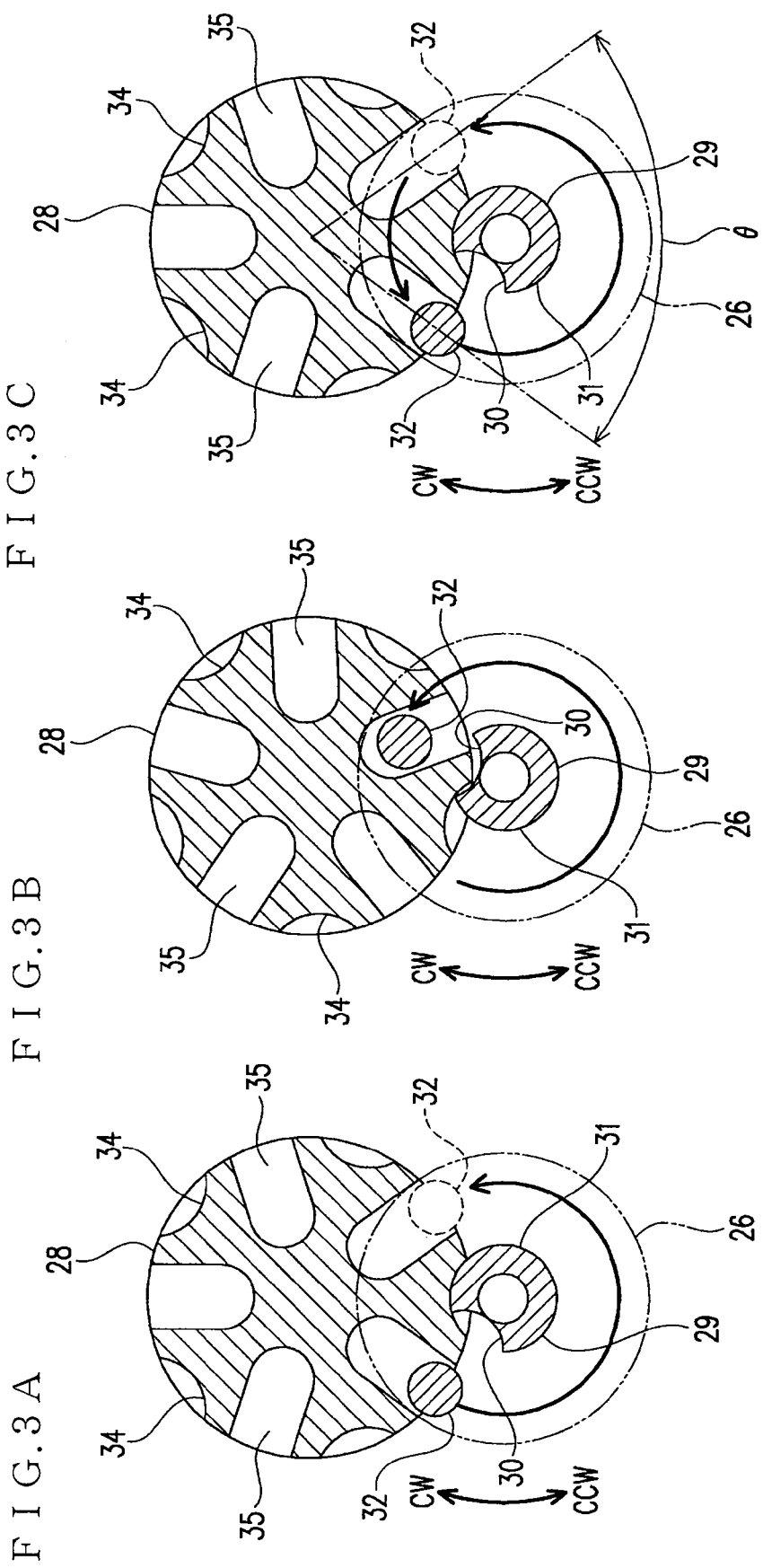
FIG. 3A is a sectional view along the Y-Y line of FIG. 1, showing the initial operation status of the stopwork of the zoom lens device in the first preferred embodiment of the present invention.
FIG. 3B is a sectional view along the Y-Y line of FIG. 1, showing the halfway operation status of the stopwork of the zoom lens device in the first preferred embodiment of the present invention.
FIG. 3C is a sectional view along the Y-Y line of FIG. 1, showing the final operation status of the stopwork of the zoom lens device in the first preferred embodiment of the present invention.

Third gear 6 engaging the second gear 7 in parallel with the operation of focus mechanism C rotates counterclockwise CCW, and driving shaft 25 also rotates counterclockwise CCW, and thereby, stopwork D operates the same as in the first preferred embodiment. That is, as shown in FIG. 3, only when pin 32 fitting in radial groove 35 is rotated, driven wheel 28 and driven shaft 27 are rotated, and second holding frame 14 and second lens group 12 are activated to come in contact with zoom cam surface 36 of driven shaft 27. In this way, as shown in FIG. 6, second lens group 12 moves in a step-like fashion to perform the zoom operation, and third lens group 13 moves non-linearly as described above, thereby accurately performing the focus operation.

Preferred Embodiment 3

The zoom lens device in the third preferred embodiment of the present invention will be described in the following with reference to FIG. 7. The third preferred embodiment is characterized in that stopwork D is parallel indexing drive G as shown in FIG. 7. The other configuration is same as for the zoom lens device in the first or second preferred embodiment.

Parallel indexing drive G is configured in that driving wheel 44 and driven wheel 45 are combined with each other, and driving wheel 44 is formed with extension 47 on plate cam 46. Driven wheel 45 is provided with a plurality of pins 48 (four pins in the figure, but the number of pins is not limited) engaging plate cam 46 which are concentrically projected from disk 49. Extension 47 serves to give a rotational force to pin 48, thereby rotating the driven wheel 45. Driving wheel 44 is fixed on driving shaft 25, and driven wheel 45 is fixed on driven shaft 27.

Since the third preferred embodiment is same in configuration as the first or second preferred embodiment, the description of same component is omitted. The operation thereof is described in the following. As motor 1 rotates, the driving force is transmitted to first gear 5, second gear 7, and third gear 6 to rotate the driving shaft 25, and then driving wheel 44 continuously rotates.

And, driven wheel 45 is rotated while extension 47 of driving wheel 44 gives the rotational force to pin 48 of driven wheel 45, and when extension 47 moves off from pin 48, driven wheel 45 stops rotating. When driven wheel 45 is rotating, zoom mechanism E operates, and the zoom operation is performed by the movement of second lens group 12.

However, when driven wheel 45 is in a stop, zoom mechanism E also stops and second lens group 12 stops as well. In this way, second lens group 12 moves in a step-like fashion due to parallel indexing drive G. On the other hand, focus mechanism C operates even when zoom mechanism E is in a stop, and the focus operation is performed by the movement of third lens group 13.

According to the zoom lens device, stopwork D is configured by parallel indexing drive G, and thereby, stopwork D can be reduced in size and structurally simplified, and it is advantageous for realizing the size reduction of the zoom lens device.

The present invention is not limited to the three preferred embodiments, and it can be changed in various ways within the range of techniques mentioned in the claims. For example, stopwork D is not limited to Geneva drive F or parallel indexing drive G, but it is possible for example to employ a combination of rotary click and ratchet wheel or a combination of pin wheel and gear wheel.

Preferred Embodiment 4

The preferred embodiment 4 of the present invention will be described with reference to FIG. 8.

The zoom lens device comprises lens system A100, driving force transmitting section B100, stopwork G100, zoom mechanism D100, and focus mechanism E100.

Figure 8:
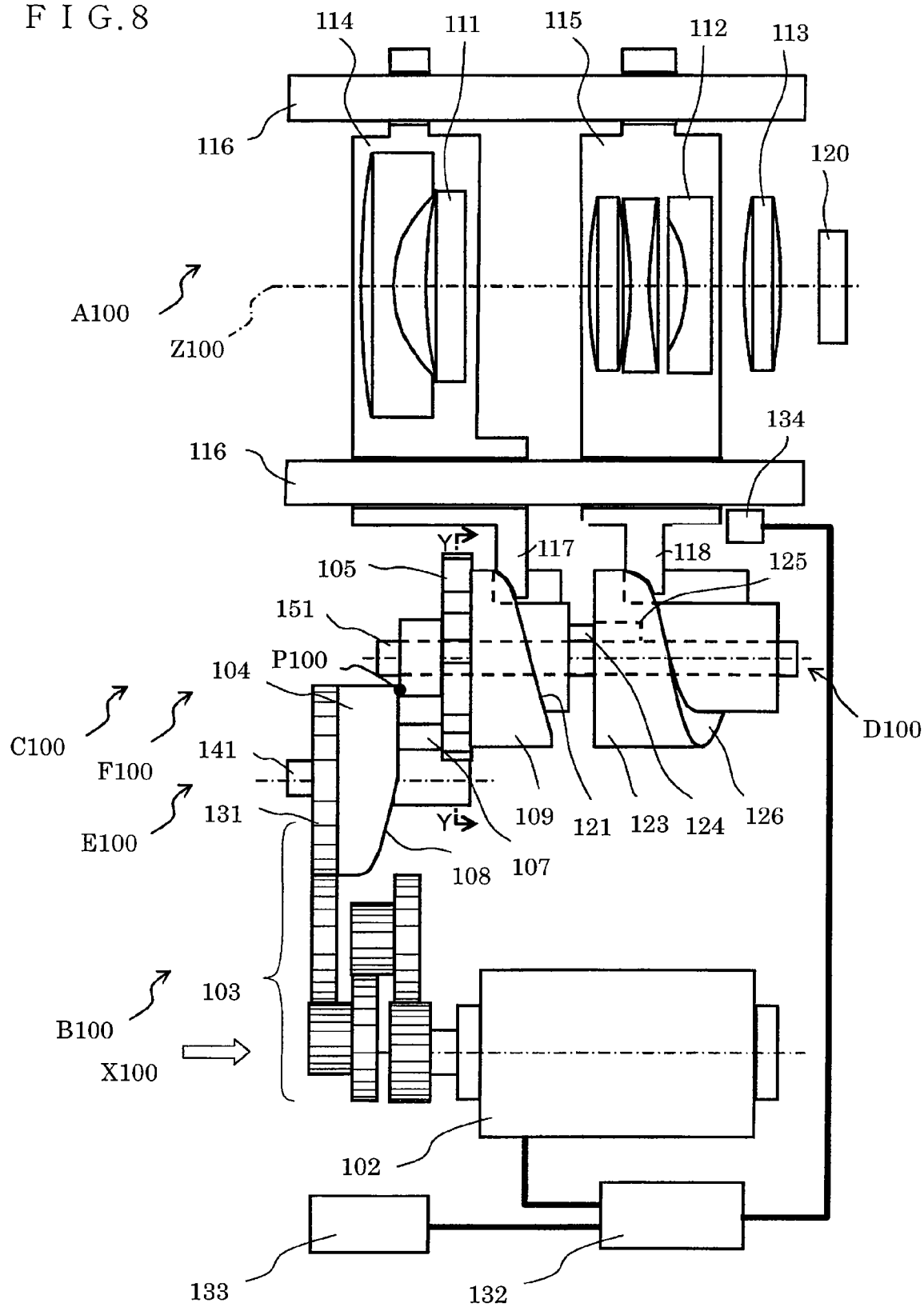
FIG. 8 is a schematic front view showing the zoom lens device in the fourth preferred embodiment of the present invention.

Lens system A100 comprises first lens group 111, second lens group 112, and third lens group 113 which are arranged on optical axis Z100 in a range from the object side (left side in FIG. 8) to the pickup side (right side in FIG. 8). Third lens group 113 confronts the pickup element 120 and is held by a frame (not shown) which is immovable. First lens group 111 and second lens group 112 are respectively held by first holding frame 114 and second holding frame 115 which are individually movable. Paired guide shafts 116 pierce the first holding frame 114 and second holding frame 115, and first lens group 111 and second lens group 112 are regulated by the guide shafts 116 when moving on optical axis Z100.

With the movement of first lens group 111 and second lens group 112, lens system A100 changes the focal distance (zoom operation), and adjusts the image forming position of lens system A100, that is, focusing (focus operation) to pickup element 120. And, each lens group is optically designed so that second lens group 112 mainly takes the role of zoom operation, and first lens group 111 mainly takes the role of focus operation. In this case, when first lens group 111 and second lens group 112 are zooming, that is, when the focal distance is changed, the locus of each position in the direction of the optical axis is, for example, as shown in FIG. 9.

Figure 9:
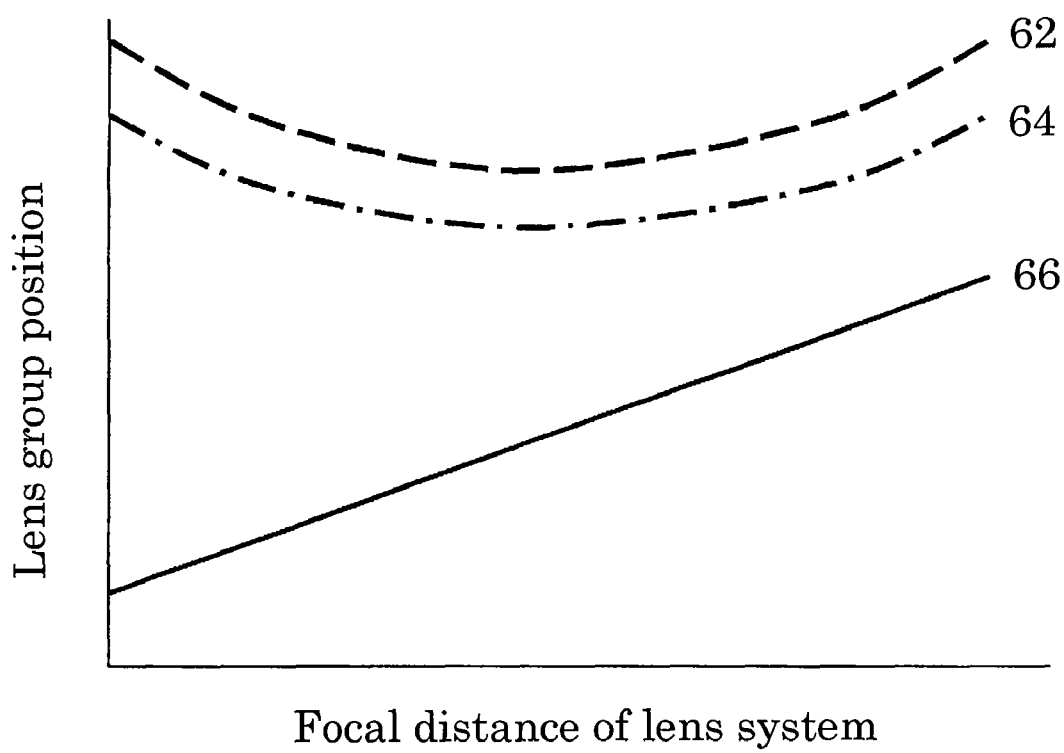
FIG. 9 shows the locus of lens group movement as against the alteration of focal distance of the zoom lens device in the fourth preferred embodiment of the present invention.

In FIG. 9, characteristic 62 corresponds to the position of first lens group 111 forming the image at the nearest distance, characteristic 64 corresponds to the position of first lens group 111 forming the image at the infinitely long distance, and characteristic 66 corresponds to the locus of movement of second lens group 112. That is, in the case of lens system A100, the focus movement is made by the movement of first lens group 111 being close to the object side, and the locus of movement for focusing is greatly different from the locus of movement for zooming.

As shown in FIG. 8, driving force transmitting section B100 is formed of gear array 103 and gear 131 at the final stage, and the driving force from motor 102 that is one driving source is transmitted to gear 131 at the final stage via gear array 103. Gear 131 at the final stage is rotatable together with driving wheel 104, and the driving force from motor 102 is transferred to stopwork C100 via driving wheel 104. Stopwork C100 is formed of Geneva drive F100. Geneva drive F100 comprises a combination of driving wheel 104 attached to driving shaft 141 and driven wheel 105 attached to driven shaft 151.

Figure 11A:
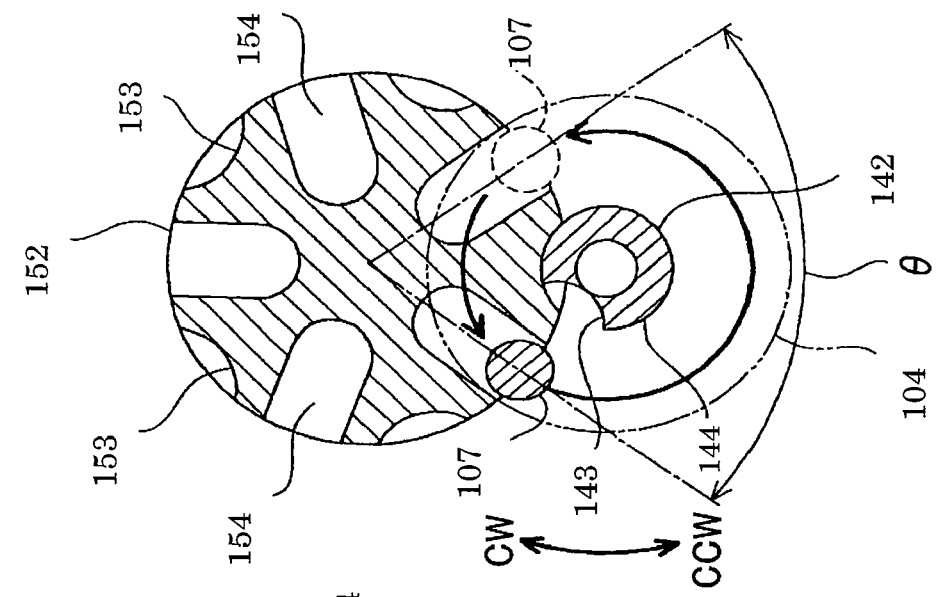
FIG. 11A is a sectional view along the Y-Y line of FIG. 8, showing the initial operation status of the stopwork of the zoom lens device in the fourth preferred embodiment of the present invention.
Figure 11B:
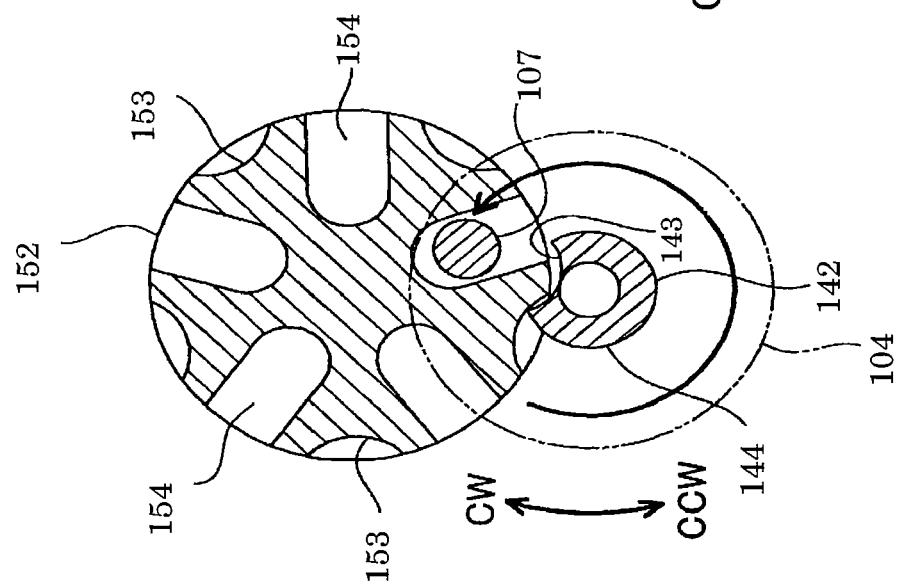
FIG. 11B is a sectional view along the Y-Y line of FIG. 8, showing the halfway operation status of the stopwork of the zoom lens device in the fourth preferred embodiment of the present invention.
Figure 11C:
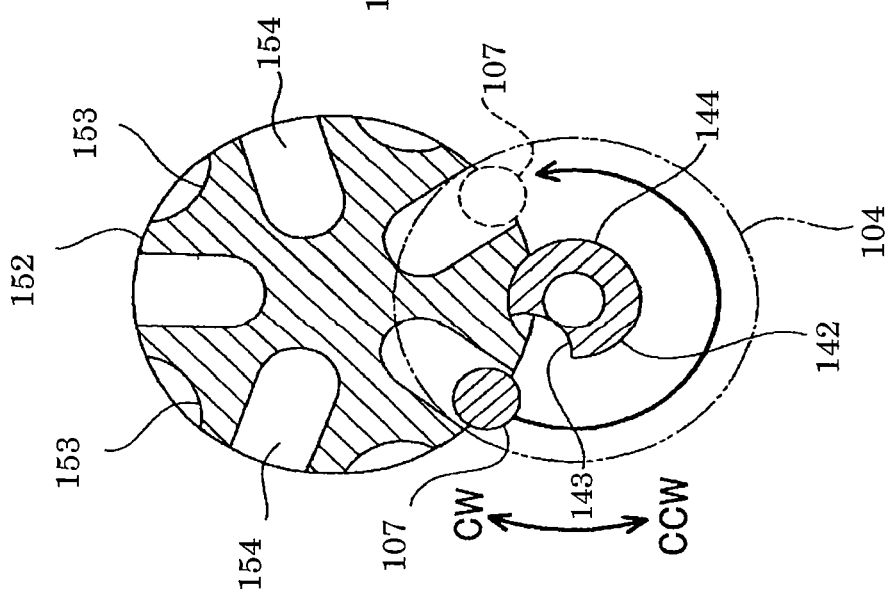
FIG. 11C is a sectional view along the Y-Y line of FIG. 8, showing the final operation status of the stopwork of the zoom lens device in the fourth preferred embodiment of the present invention.

Driving wheel 104 is, as shown in FIG. 11A to FIG. 11C, formed with projection 144 having arcuate convex 142 and arcuate concave 143, and further, pin 107 is disposed outside the arcuate concave 143. On the other hand, driven wheel 105 is configured in that disk 152 fixed on driven shaft 151 is formed with arcuate convex 142 and arcuate concave 153, and at a specific angle θ, a plurality of radial grooves 154 (five grooves in the figure, but it is not limited to five grooves) in which pin 107 fits.

As shown in FIG. 8, when gear 131 at the final stage rotates, driving shaft 141 rotates. Then, pin 107 of driving wheel 104 continuously rotates. However, driven wheel 105 is rotated only while pin 107 is in radial groove 154. That is, driven wheel 105 is intermittently rotated. The driving force from such stopwork C100 is transferred to zoom mechanism D100.

Zoom mechanism D100 comprises first cam 109, second cam 123, cam follower 117 disposed in first holding frame 114 of first lens group 111, and cam follower 118 disposed in second holding frame 115 of second lens group 112.

First cam 109 is formed with cam surface 121, and cam follower 117 of first lens group 111 in the lens system is in contact with cam surface 121. The contact is maintained with an appropriate pressure of a spring (not shown).

Second cam 123 is disposed in a coaxial fashion with first cam 109. Second cam 123 is rotatable around driven shaft 151 and immovable in the axial direction. Also, first cam 109 and second cam 123 are engaged with each other by key 124 and key groove 125. The rotating torque of first cam 109 is transmitted to second cam 123. Key 124 and key groove 125 are not disengaged from each other even in case first cam 109 moves in the axial direction.

Second cam 123 is formed with cam surface 126. Cam follower 118 of second lens group 112 of the lens system is in contact with cam surface 126. The contact is maintained with an appropriate pressure of a spring (not shown).

Also, the driving force from motor 102 is transmitted to focus mechanism E100 via driving wheel 104.

Focus mechanism E100 comprises driving wheel 104 with cam surface 8 formed at the right side of the figure, cam follower 117 of first lens group 111, and first cam 109.

Figure 10:
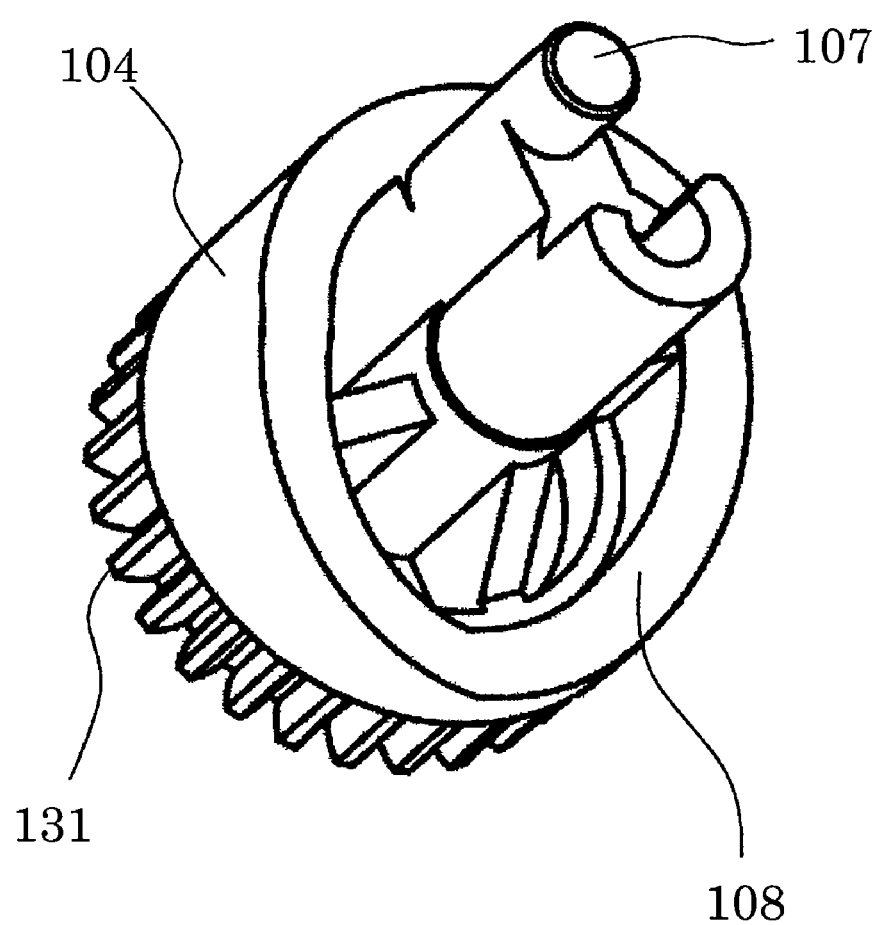
FIG. 10 is a perspective view of a driving wheel of the zoom lens device in the fourth preferred embodiment of the present invention.

Cam surface 108 is shaped so that it returns to the initial position, drawing a V or U shape in the circumferential direction as shown in FIG. 10. The perspective view of driving wheel 104 provided with such cam surface 108 is shown in FIG. 10.

First cam 109 is configured so as to rotate and move together with driven wheel 105, and typically, first cam 109 is a part of driven wheel 105. First cam 109 is disposed so as to come in contact with cam surface 108 of driving wheel 104 at contact point P100 of its left end. The contact is maintained with an appropriate pressure of a spring (not shown). First cam 109 and driven wheel 105 being integral therewith or a part thereof is rotatable around driven shaft 151, and movable in the direction axially parallel to driven shaft 151.

The operation of the fourth preferred embodiment will be described in the following.

When motor 102 rotates counterclockwise CCW as viewed in the X direction of the figure, the rotation is transmitted to gear array 103 to rotate final-stage gear 131 and driving wheel 104. In this case, the rotating operation of driving wheel 104 is intermittently transferred to driven wheel 105 by means of stopwork C100. Here, the rotational relation between driving wheel 104 and driven wheel 105 is described with reference to FIG. 11A to FIG. 11C.

That is, as shown in FIG. 11A, until driving wheel 104 rotates counterclockwise CCW, and pin 107 changes its position from radial groove 154 to neighboring radial groove 154, driven wheel 105 is in a stop. Accordingly, both first cam 109 and second cam 123 do not rotate, and first lens group 111 and second lens group 112 of the lens system being in contact with the respective cams are in a state of stopping the zoom operation.

Subsequently, as shown in FIG. 11B, until pin 107 of rotating driving wheel 104 gets into radial groove 154, and as shown in FIG. 11C, pin 107 gets out of radial groove 154, driven wheel 105 rotates clockwise just by angle θ. During the time, driven shaft 151 (see FIG. 8) also rotates just by angle θ, and the rotation causes first cam 109 and second cam 123 to rotate by angle θ as well, and then, first lens group 111 and second lens group 112 move in the direction of the optical axis by a predetermined amount defined by the curve of the cam surface. That is, the zoom operation is performed by one step forward.

Subsequently, as shown in FIG. 11C, until pin 107 gets out of radial groove 154, and gets into neighboring radial groove 154, driving wheel 104 rotates, while driven wheel 105 does not rotate, the same as described above. Accordingly, during the time, both first cam 109 and second cam 123 do not rotate, and the zoom operation is not performed.

In the above operation, the continuous rotating movement fed from motor 102 is converted to intermittent movement repeating the periods of rotation and stop, and then, it is transferred to first cam 109 and second cam 123.

On the other hand, as shown in FIG. 8, since the left end shown of first cam 109 is disposed so as to come in contact with cam surface 108 of driving wheel 104, contact position P100 of the both changes with the rotation of driving wheel 104 along cam surface 108, then first cam 109 moves in the axial direction.

As described above, since cam surface 108 is shaped so that it returns the initial position, drawing a V or U shape in the circumferential direction, first cam 109 axially makes one reciprocal movement in a parallel fashion with the rotation of driving wheel 104. And, the shape forming angle about the shaft of cam surface 108 on the basis of the position of pin 107 is properly designed, and it is configured in that while pin 107 is engaging any one of five radial grooves 154 of driven wheel 105, first cam 109 does not move in the axial direction, and while the pin is not engaging any one of five radial grooves 154, the cam makes one reciprocal movement in the axial direction. The axial movement of first cam 109 is schematically shown in FIG. 12A to FIG. 12E.

Figure 12A:
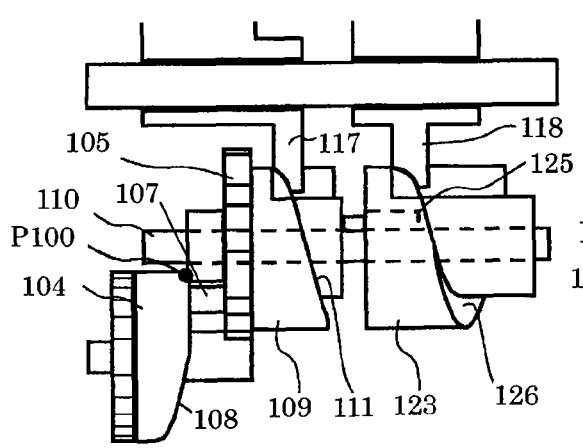
FIG. 12A shows a state of a driving wheel and a driven wheel engaging each other, showing the axial position change of the first cam along with the rotation of the driving wheel.

That is, as shown in FIG. 12A, when pin 107 of driving wheel 104 is engaging the driven wheel 105 and in a state of transferring the driving force, driving wheel 104 is in contact with cam surface 108 at a portion other than the above-mentioned V or U shaped portion. Driven wheel 105 and first cam 109 do not move in the axial direction. In this case, first lens group 111 does not move individually, and the focus operation is not performed. As the driving force is transmitted to driven wheel 105, the rotational driving force is transmitted to first cam 109 and second cam 123, and then the zoom operation is performed.

Figure 12D:
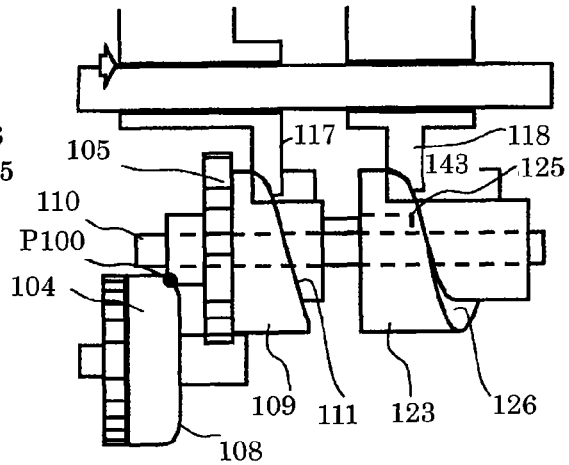
FIG. 12D shows a state of a driving wheel and a driven wheel disengaged from each other, showing the axial position change of the first cam along with the rotation of the driving wheel.
Figure 12B:
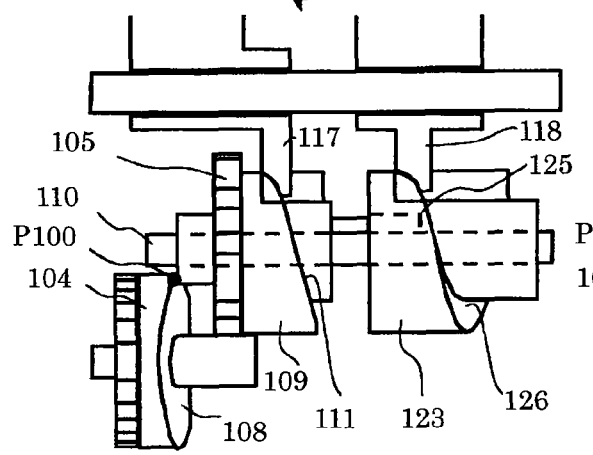
FIG. 12B shows a state of a driving wheel and a driven wheel disengaged from each other, showing the axial position change of the first cam along with the rotation of the driving wheel.

Subsequently, as shown in FIG. 12B, when pin 107 of driving wheel 104 is disengaged from driven wheel 105, discontinuing the transfer of rotational driving force to driven wheel 105, first cam 109 starts to move to the left in the figure along the V or U shaped portion of cam surface 108 of driving wheel 104. Then, first lens group 111 begins to individually move to the left in the figure to start the focus operation. On the other hand, since the rotational driving force is not transmitted to driven wheel 105, the zoom operation is stopped.

Figure 12E:
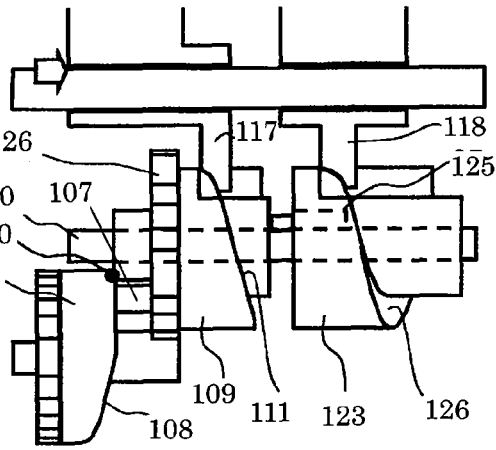
FIG. 12E shows a state of a driving wheel and a driven wheel again engaging each other, showing the axial position change of the first cam along with the rotation of the driving wheel.
Figure 12C:
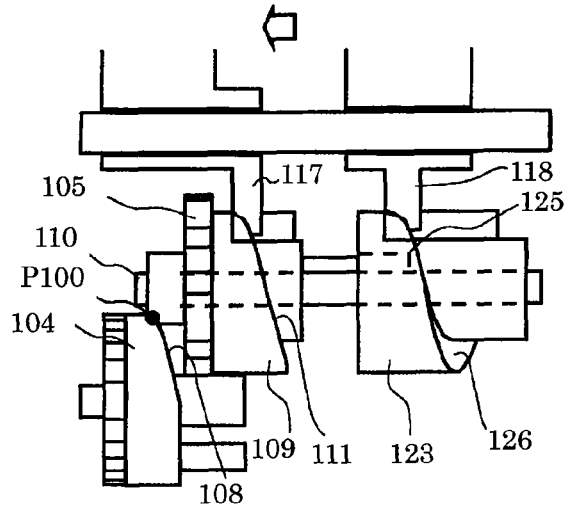
FIG. 12C shows a state of a driving wheel and a driven wheel disengaged from each other, showing the axial position change of the first cam along with the rotation of the driving wheel.

Subsequently, as shown in FIG. 12C, with pin 107 of driving wheel 104 being disengaged from driven wheel 105, first cam 109 reaches the bottom of the V or U shaped portion of cam surface 108 of driving wheel 104, that is, the left end of the figure. In this case, first lens group 111 moves to the leftmost end in focus operation. On the other hand, since the rotational driving force is not transmitted to driven wheel 105, the zoom operation is still discontinued.

Subsequently, as shown in FIG. 12D, with pin 107 of driving wheel 104 being disengaged from driven wheel 105, first cam 109 returns to the initial position over the V or U shaped portion of cam surface 108 of driving wheel 104, and returns to the right end of the figure. In this case, first lens group 111 moves to the rightmost end in focus operation. On the other hand, the rotational driving force is not transmitted to driven wheel 105, and the zoom operation is still discontinued.

Subsequently, as shown in FIG. 12E, pin 107 of driving wheel 104 again engages driven wheel 105 to transmit the driving force to driven wheel 105. Also, first cam 109 comes in contact with a portion other than the V or U shaped portion of cam surface 108 of driving wheel 104, then driven wheel 105 and first cam 109 discontinue their axial movement. In this case, first lens group 111 does not move individually, and the focus operation is discontinued. On the other hand, since the driving force is transmitted to driven wheel 105, the rotational driving force is transmitted to first cam 109 and second cam 123, then the zoom operation is started.

Figure 13:
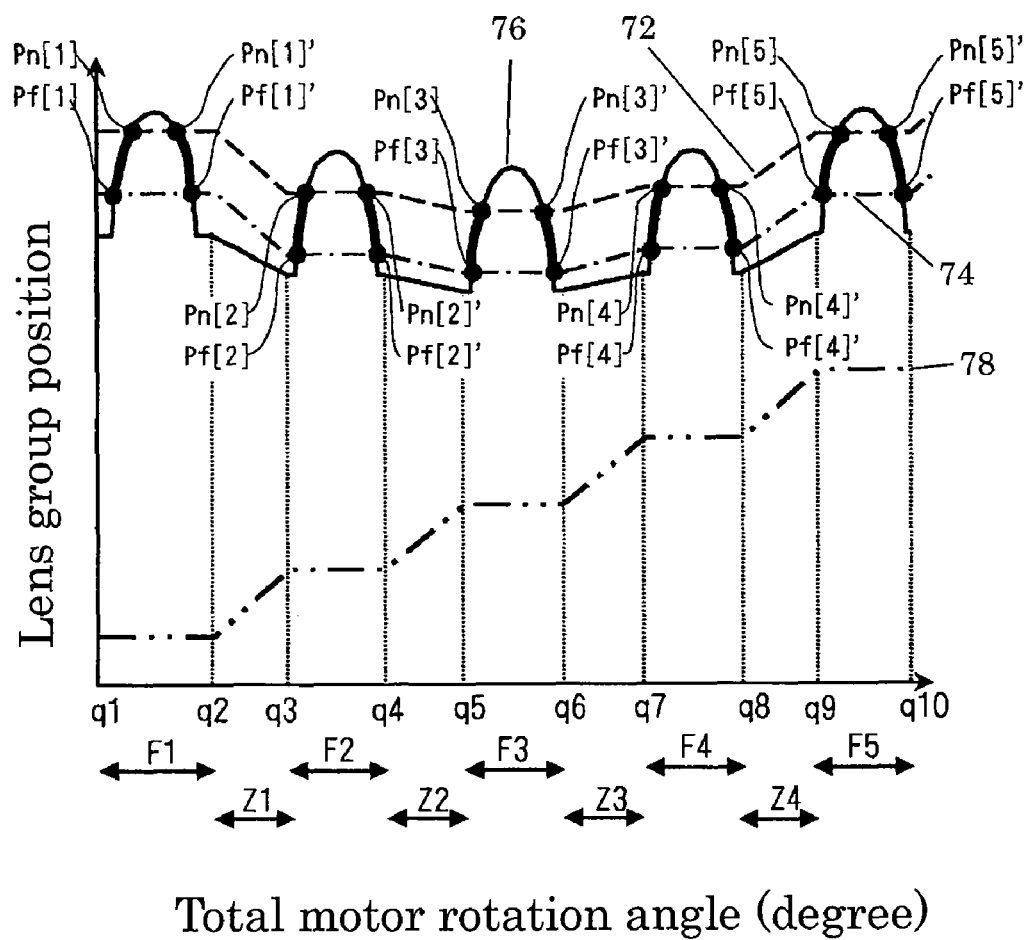
FIG. 13 shows the locus of each lens group movement as against the total rotating angle of the motor of the zoom lens device in the fourth preferred embodiment of the present invention.

The locus of movement of first lens group 111 and second lens group 112 according to the above operation is shown in FIG. 13. In FIG. 13, the horizontal axis corresponds to the total rotation angle of motor 102. q1, q3, q5, and q9 on the horizontal axis represent the positions shown by continuous line of pin 107 in FIG. 11A, while q2, q4, q6, and q8 represent the positions shown by broken line of pin 107 in FIG. 11A. Also, in FIG. 13, characteristic 72 (broken line) shows the position of first lens group 111 forming an image in the nearest distance mode, characteristic 74 (chain single-dashed line) shows the position of first lens group 111 forming an image in the infinite distance mode, characteristic 76 (continuous line) shows the locus of movement of first lens group 111, and characteristic 78 (chain double-dashed line) shows the locus of movement of second lens group 112.

Section F1 to F5 is a section where first cam 109 and second cam 123 do not rotate together but only first cam 109 reciprocally moves in a parallel fashion. On the other hand, section Z1 to Z4 is a section where first cam 109 and second cam 123 rotationally moves together. That is, section F1 to F5 corresponds to each zoom step, and section Z1 to Z4 corresponds to the period of shifting to the neighboring step.

When second lens group 112 is moved by stopwork C in a step-like fashion as shown by characteristic 78 in FIG. 13, the theoretical positions of first lens 111 forming an image in each of the nearest and infinite distance modes respectively correspond to characteristic 72 and characteristic 74.

Here, with the shape of cam surface 108 of driving wheel 104 properly formed, as shown by characteristic 76 (continuous line) in the figure, it can be configured in that in each of the section F1 to F5, the locus of first lens group 111 covers the range from position Pf [i]·Pf [i]' ($1 \leq i \leq 5$) corresponding to image forming in the infinite distance mode to position Pn [i]·Pn [i]' ($1 \leq i \leq 5$) corresponding to image forming in the nearest distance mode. Due to this configuration, in each zoom step, the focus operation can be realized by moving only the first lens group 111.

For the focus operation in each zoom step, it is preferable to use the range of Pn [i] to Pf [i] ($1 \leq i \leq 5$) or the range of Pn [i]' to Pf [i]' ($1 \leq i \leq 5$), or to use both of the ranges.

The control of the preferred embodiment 4 will be described in the following with reference to FIG. 8. Sensor 134 is installed near the second lens group 112 of the lens system. The movement of second lens group 112 is detected by sensor 134, and transmitted to controller 132. Controller 132 checks the detected movement, and controls the motor 102 by using the power supplied from power source 133. The position of sensor 134 installed is not limited to this position. For example, same effects can be obtained even when the sensor is installed at a position for detecting the rotating angle of first cam 109 or second cam 123.

In the above description, the rotation of the motor is counterclockwise (CCW), but the operation is same even when the rotation is clockwise (CW).

According to the zoom lens device described above, zoom mechanism D100 moves the first lens group 111 and second lens group 112 in a step-like fashion, repeating the states of stop and move, in the same direction as the optical axis, thereby realizing the step zoom operation. Also, in each zoom step of such a step zoom, focus mechanism E100 moves the first cam 109 in the same direction as the optical axis to make the focus adjustment. That is, as compared with the conventional example wherein the locus of lens movement or zooming is partially utilized for focusing, it is possible to make the focus movement more independent of the zoom movement. Accordingly, according to the zoom lens device, even in case of using an optical system wherein the locus of each lens group movement for focus movement, for example, greatly deviates from that of zoom movement, it is possible to provide a step zoom device coping with every lens design because of being able to make the focus adjustment in each zoom step. Particularly, the focus movement is obtained by the movement of first lens group 111 close to the object side, and it is easier to maintain the accuracy because the amount of focus movement is generally large, giving rise to the quality improvement of the zoom lens device.

Preferred Embodiment 5

Figure 14:
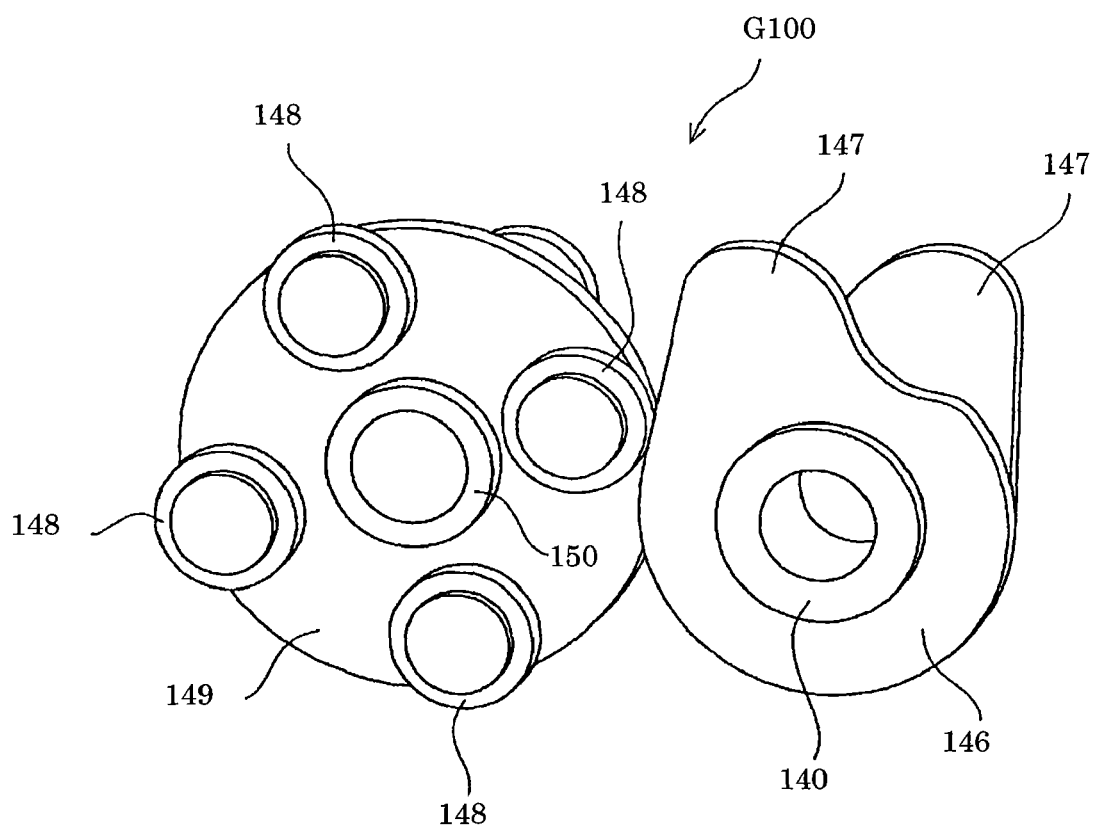
FIG. 14 is a schematic front view of the zoom lens device in the fifth preferred embodiment of the present invention.

The zoom lens device in the preferred embodiment 5 of the present invention will be described in the following with reference to FIG. 14. The preferred embodiment 5 is characterized in that stopwork C100 shown in FIG. 8 is a parallel indexing drive G100 as shown in FIG. 14. The other configuration is same as for the zoom lens device in the preferred embodiment 4.

Parallel indexing drive G100 is configured in that driving wheel 140 is combined with driven wheel 150, and driving wheel 140 is formed with extension 147 on plate cam 146. Driven wheel 150 is provided with a plurality of pins (four pins in the figure, but the number of pins is not limited) 148 engaging plate cam 146, which are concentrically projected from disk 149. Extension 147 gives a rotating force to pin 148, and thereby, driven wheel 150 is rotated. Driving wheel 140 is fixed on driving shaft 141, and driven wheel 150 is fixed on driven shaft 151.

The other configuration is same as in the preferred embodiment 4, and the detailed description is omitted. The operation will be described in the following. As motor 102 rotates, the driving force is transmitted to final-stage gear 131 via gear array 103 to rotate driving shaft 141. In this way, driving wheel 140 continuously rotates.

And, driven wheel 150 is rotated only while extension 147 of driving wheel 140 gives the rotating force to pin 148 of driven wheel 150, and with extension 147 removed off from pin 148, driven wheel 150 stops rotating. When driven wheel 150 is rotating, zoom mechanism D100 operates to move first lens group 111 and second lens group 112, thereby performing the zoom operation.

When driven wheel 150 is in a stop, zoom mechanism D100 also stops operating, then first lens group 111 and second lens group 112 stop moving as well. Thus, first lens group 111 and second lens group 112 move in a step-like fashion due to parallel indexing drive G100. On the other hand, during the time, focus mechanism E100 operates first cam 109 in the axial direction to move the first lens group 111, thereby performing the focus operation.

According to the zoom lens device, since stopwork C100 formed by parallel indexing drive G100, the same action and effect as in the preferred embodiment 4 can be obtained. Also, stopwork C100 can be reduced in size and structurally simplified, and it is advantageous for the size reduction of the zoom lens device.

The present invention is not limited to the preferred embodiments described above, but it is applicable to every other use. For example, stopwork C100 is not limited to Geneva drive F100 or parallel indexing drive G100. For example, it is possible to employ a mechanism with a rotary click and a ratchet wheel combined or a mechanism with a pin wheel and a gear combined.

INDUSTRIAL APPLICABILITY

As described above, the zoom lens device of the present invention can be effectively used in the field of portable electronic equipment such as portable telephones required to be miniaturized, and its industrial applicability is very high. Also, the present invention is preferable to be used as a zoom lens device provided with a so-called step zoom mechanism capable of selecting a plurality of focal distances. Particularly, it is preferable to be used as a zoom lens device using an optical system of which the locus of lens movement for focus operation greatly deviates from the locus of lens movement for zoom operation, which assures excellent industrial applicability.

The invention claimed is:

1. A zoom lens device comprising: a lens system with a plurality of lens groups arranged on an optical axis, a zoom mechanism for changing the focal distance of the lens system by moving at least one lens group in the same direction as the optical axis, a focus mechanism for adjusting the image forming position of the lens system by moving at least one lens group in the same direction as the optical axis, a driving force transmitting section for transmitting a driving force from one driving source to the zoom mechanism and the focus mechanism,
wherein the driving force transmitting section is provided with an stopwork for intermittently transferring a driving force from the driving source to the zoom mechanism.

2. The zoom lens device of claim 1, wherein the stopwork is a Geneva drive.

3. The zoom lens device of claim 2, wherein the zoom mechanism comprises a zoom follower disposed in the lens group for changing the focal distance, a spiral zoom cam surface disposed in the stopwork, and an activating means for making the zoom cam follower come in contact with the zoom cam surface.

4. The zoom lens device of claim 2, wherein the focus mechanism comprises a focus follower disposed in the holding frame for holding the lens group for adjusting the image forming position, a moving body moved by the driving force of the driving force transmitting section in the same direction as the optical axis, and an activating means for making the focus follower come in contact with the moving body.

5. The zoom lens device of claim 2, wherein the focus mechanism comprises a focus follower disposed in the holding frame for holding the lens group for adjusting the image forming position, a spiral focus cam surface rotated by the driving force of the driving force transmitting section in the same direction as the optical axis, and an activating means for making the focus follower come in contact with the focus cam surface.

6. The zoom lens device of claim 1, wherein the stopwork is a parallel indexing drive.

7. The zoom lens device of claim 6, wherein the zoom mechanism comprises a zoom follower disposed in the lens group for changing the focal distance, a spiral zoom cam surface disposed in the stopwork, and an activating means for making the zoom cam follower come in contact with the zoom cam surface.

8. The zoom lens device of claim 6, wherein the focus mechanism comprises a focus follower disposed in the holding frame for holding the lens group for adjusting the image forming position, a moving body moved by the driving force of the driving force transmitting section in the same direction as the optical axis, and an activating means for making the focus follower come in contact with the moving body.

9. The zoom lens device of claim 6, wherein the focus mechanism comprises a focus follower disposed in the holding frame for holding the lens group for adjusting the image forming position, a spiral focus cam surface rotated by the driving force of the driving force transmitting section in the same direction as the optical axis, and an activating means for making the focus follower come in contact with the focus cam surface.

10. The zoom lens device of claim 1, wherein the zoom mechanism comprises a zoom follower disposed in the lens group for changing the focal distance, a spiral zoom cam surface disposed in the stopwork, and an activating means for making the zoom cam follower come in contact with the zoom cam surface.

11. The zoom lens device of claim 10, wherein the focus mechanism comprises a focus follower disposed in the holding frame for holding the lens group for adjusting the image forming position, a moving body moved by the driving force of the driving force transmitting section in the same direction as the optical axis, and an activating means for making the focus follower come in contact with the moving body.

12. The zoom lens device of claim 10, wherein the focus mechanism comprises a focus follower disposed in the holding frame for holding the lens group for adjusting the image forming position, a spiral focus cam surface rotated by the driving force of the driving force transmitting section in the same direction as the optical axis, and an activating means for making the focus follower come in contact with the focus cam surface.

13. The zoom lens device of claim 1, wherein the focus mechanism comprises a focus follower disposed in the holding frame for holding the lens group for adjusting the image forming position, a moving body moved by the driving force of the driving force transmitting section in the same direction as the optical axis, and an activating means for making the focus follower come in contact with the moving body.

14. The zoom lens device of claim 1, wherein the focus mechanism comprises a focus follower disposed in the holding frame for holding the lens group for adjusting the image forming position, a spiral focus cam surface rotated by the driving force of the driving force transmitting section in the same direction as the optical axis, and an activating means for making the focus follower come in contact with the focus cam surface.

15. A zoom lens device comprising: a lens system with a plurality of lens groups arranged on an optical axis, at least one zoom mechanism for changing the focal distance of the lens system by moving at least one lens group in the same direction as the optical axis and stopping the movement of at least one lens group for a fixed period of time at a plurality of predetermined focal distances, a focus mechanism for adjusting the image forming position of the lens system by moving at least one lens group in the same direction as the optical axis by moving at least one of the zoom mechanisms, and a driving force transmitting section for transmitting a driving force from one driving source to the focus mechanism and the zoom mechanism, wherein the focus mechanism moves at least one of the zoom mechanisms in the same direction as the optical axis only while the zoom mechanism is in a state of stopping at least one lens group; and wherein the zoom mechanism is intermittently supplied with a driving force from the driving source via an stopwork.

16. The zoom lens device of claim 15, wherein the stopwork is a Geneva drive.

17. The zoom lens device of claim 15, wherein the stopwork is a parallel indexing drive.

18. A zoom lens device comprising: a lens system with a plurality of lens groups arranged on an optical axis, at least one zoom mechanism for changing the focal distance of the lens system by moving at least one lens group in the same direction as the optical axis and stopping the movement of at least one lens group for a fixed period of time at a plurality of predetermined focal distances, a focus mechanism for adjusting the image forming position of the lens system by moving at least one lens group in the same direction as the optical axis by moving at least one of the zoom mechanisms, and a driving force transmitting section for transmitting a driving force from one driving source to the focus mechanism and the zoom mechanism, wherein the focus mechanism moves at least one of the zoom mechanisms in the same direction as the optical axis only while the zoom mechanism is in a state of stopping at least one lens group; and wherein the stopwork is a Geneva drive.

19. A zoom lens device comprising: a lens system with a plurality of lens groups arranged on an optical axis, at least one zoom mechanism for changing the focal distance of the lens system by moving at least one lens group in the same direction as the optical axis and stopping the movement of at least one lens group for a fixed period of time at a plurality of predetermined focal distances, a focus mechanism for adjusting the image forming position of the lens system by moving at least one lens group in the same direction as the optical axis by moving at least one of the zoom mechanisms, and a driving force transmitting section for transmitting a driving force from one driving source to the focus mechanism and the zoom mechanism, wherein the focus mechanism moves at least one of the zoom mechanisms in the same direction as the optical axis only while the zoom mechanism is in a state of stopping at least one lens group; and wherein the stopwork is a parallel indexing drive.

\* \* \* \* \*